United States Patent
Burke et al.

(10) Patent No.: US 10,713,922 B1
(45) Date of Patent: *Jul. 14, 2020

(54) METHOD AND APPARATUS FOR EXCHANGING MESSAGES WITH USERS OF A REAL PROPERTY MONITORING AND CONTROL SYSTEM

(71) Applicant: Katerra, Inc., Menlo Park (CA)

(72) Inventors: Sean Burke, Morgan Hill, CA (US);
Brian Joseph Reeves, Hamilton (CA);
Paul Edward Reeves, Oakville (CA)

(73) Assignee: Katerra, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,650

(22) Filed: Dec. 31, 2018

Related U.S. Application Data

(63) Continuation-in-part of application No. 16/158,211, filed on Oct. 11, 2018, which is a continuation-in-part
(Continued)

(51) Int. Cl.
*G08B 21/22* (2006.01)
*G08B 5/22* (2006.01)
(Continued)

(52) U.S. Cl.
CPC ............. *G08B 21/22* (2013.01); *G08B 5/223* (2013.01); *G08B 13/08* (2013.01); *H04L 67/10* (2013.01); *H04W 4/021* (2013.01)

(58) Field of Classification Search
CPC ........ G08B 21/22; G08B 21/02; G08B 23/00; G08B 25/00; G08B 31/00; G08B 21/0469; H04W 4/021
See application file for complete search history.

(56) References Cited

U.S. PATENT DOCUMENTS 9,489,826 B1 * 11/2016 Hutz ...................... H04M 11/04
10,054,329 B1     8/2018 Hutz et al.
(Continued)

FOREIGN PATENT DOCUMENTS

| WO | 2005040997 A2 | 5/2005 |
| WO | 2017066835 A1 | 4/2017 |
| WO | 2018209123 A1 | 11/2018 |

OTHER PUBLICATIONS

Introducing the ecobee3 Smart Thermostat and Wireless Remote Sensors, Sep. 16, 2014, ecobee, Canada.
(Continued)

*Primary Examiner* — Mirza F Alam
(74) *Attorney, Agent, or Firm* — Elliott, Ostrander & Preston, P.C.

(57) ABSTRACT

A monitoring and control system receives input indicating occupancy state of a user with regard to a designated area, or a plurality of areas therein or portions thereof. The system further receives, from one or more of a plurality of sensing capable devices of, or in communication with, the monitoring and control system, input indicating a respective event involving the user entering or exiting the designated area, or an area therein or portion thereof, the sensing capable devices situated on or near the user, within the designated area, or in one or more of the plurality of areas therein, or portions thereof. The system transmits a message to the user responsive to the respective event involving the user entering or exiting the designated area and the occupancy state of the user with regard to the designated area.

18 Claims, 15 Drawing Sheets

Related U.S. Application Data of application No. 15/976,661, filed on May 10, 2018, which is a continuation-in-part of application No. 15/963,031, filed on Apr. 25, 2018.

(60) Provisional application No. 62/611,782, filed on Dec. 29, 2017, provisional application No. 62/504,052, filed on May 10, 2017, provisional application No. 62/504,005, filed on May 10, 2017.

(51) Int. Cl.
    *H04L 29/08* (2006.01)
    *G08B 13/08* (2006.01)
    *H04W 4/021* (2018.01)

(56) References Cited

U.S. PATENT DOCUMENTS

| | | | | |
|---|---|---|---|---|
| 2007/0262857 A1* | 11/2007 | Jackson | ........... | G08B 13/19656 340/506 |
| 2009/0027196 A1* | 1/2009 | Schoettle | ............ | G08B 13/10 340/541 |
| 2011/0181412 A1 | 7/2011 | Alexander et al. | | |
| 2014/0091936 A1* | 4/2014 | O'Reilly | ............ | H05B 37/0227 340/669 |
| 2014/0101082 A1 | 4/2014 | Matsuoka et al. | | |
| 2015/0347916 A1 | 12/2015 | Warren et al. | | |
| 2016/0049071 A1* | 2/2016 | Beaver | ................ | G08B 29/185 340/514 |
| 2016/0300479 A1 | 10/2016 | Modi et al. | | |
| 2017/0132888 A1 | 5/2017 | Conlon et al. | | |
| 2019/0171178 A1 | 6/2019 | Burke et al. | | |

OTHER PUBLICATIONS

Final Office Action for U.S. Appl. No. 15/963,031, dated Sep. 19, 2019, 22 pages.

Final Office Action for U.S. Appl. No. 15/976,661, dated Sep. 25, 2019, 26 pages.

International Search Report and Written Opinion for International Patent Application No. PCT/US2018/032123, dated Sep. 3, 2018, 12 pages.

Non-Final Office Action for U.S. Appl. No. 16/158,211, dated Sep. 30, 2019, 14 pages.

Non-Final Office Action for U.S. Appl. No. 16/237,661, dated Sep. 25, 2019, 13 pages.

\* cited by examiner

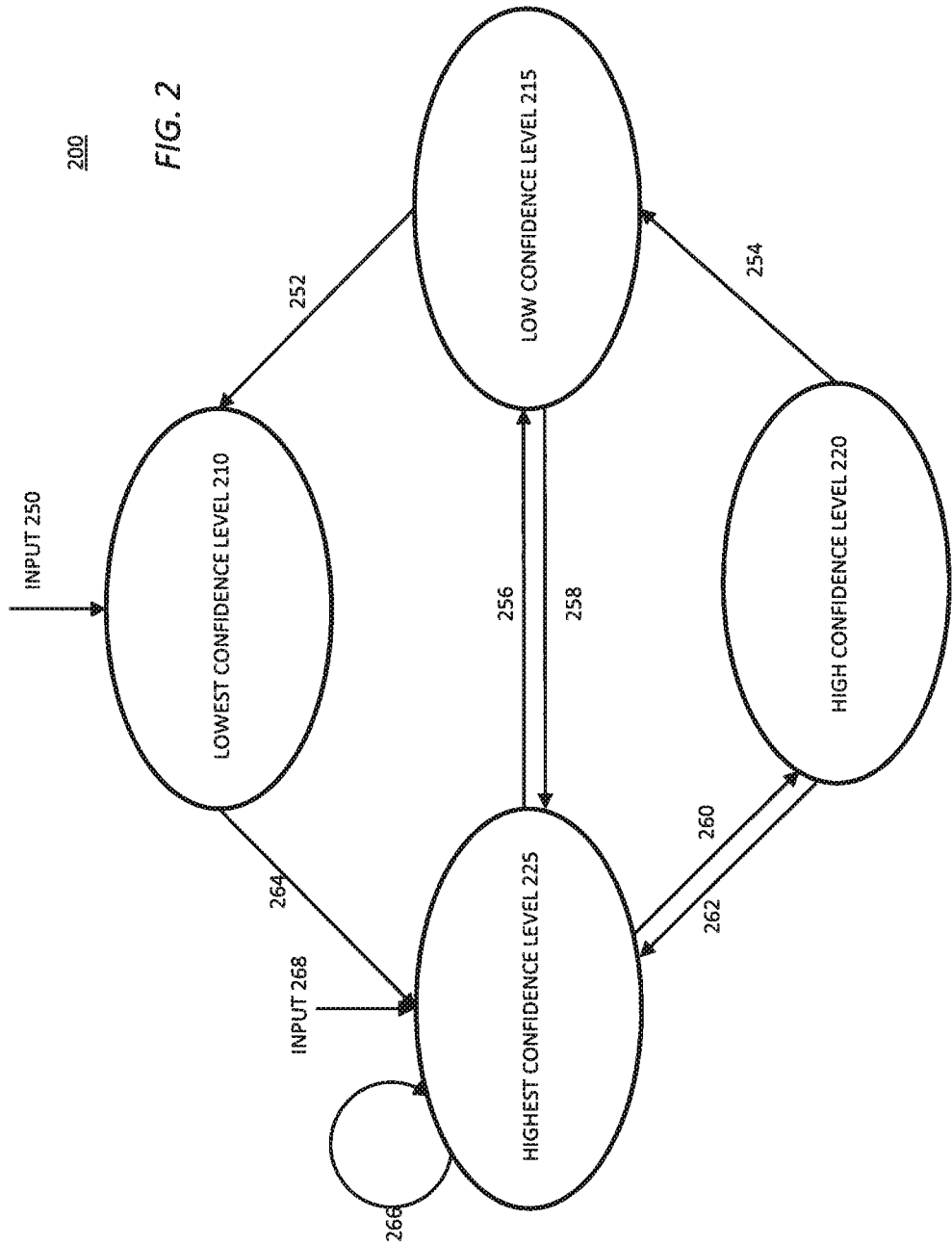

| | | | | | |
|---|---|---|---|---|---|
| E1: | P_A1 | P_A2 | P_An | | |
| E2: | P_A1 | P_A2 | P_An | | |
| E3: | P_A1 | P_A2 | P_An | | |
| OP: | OP_A1 | OP_A2 | OP_An | | |
| T: | T_OP_A1 | T_OP_A2 | T_OP_An | | |
| OP > T: | Y/N | Y/N | Y/N | | |

FIG. 7

METHOD AND APPARATUS FOR EXCHANGING MESSAGES WITH USERS OF A REAL PROPERTY MONITORING AND CONTROL SYSTEM

RELATED APPLICATIONS

This application claims the benefit of the filing date of U.S. provisional patent application No. 62/611,782, filed Dec. 29, 2017, entitled "Autonomous Home and Building Platform", and is a continuation-in-part of U.S. nonprovisional patent application Ser. No. 16/158,211, filed Oct. 11, 2018, entitled "Method and Apparatus for Real Property Monitoring and Control System, which is a continuation-in-part of U.S. nonprovisional patent application Ser. No. 15/976,661, filed May 10, 2018, entitled "Method and Apparatus for Real Property Monitoring and Control System", which is a continuation-in-part of U.S. nonprovisional patent application Ser. No. 15/963,031, filed Apr. 25, 2018, entitled "Method and Apparatus for Real Property Alarm System", which claims the benefit of the filing date of U.S. provisional patent application No. 62/504,052, filed May 10, 2017, entitled "Mountable Thermistor", and U.S. provisional patent application No. 62/504,005, filed May 10, 2017, entitled "A Continuous Monitoring Security Management System and Method of Use", the entire contents of all of which are incorporated by reference under 37 C.F.R. § 1.57.

TECHNICAL FIELD

Embodiments of the present invention relate to monitoring and control systems, and in particular to a monitoring and control system for a home, building or campus environment that is continuously engaged and that does not need to be turned on or turned off by a user as the user enters or exits the premises.

BACKGROUND

Traditional alarm or security systems need to be manually activated or "armed" by a user in order for the system to trigger an alarm; correspondingly, the system needs to be manually "disarmed" by a user to deactivate the system to prevent a false alarm upon return. The system requires manual intervention to be effective. When not armed, the system will, at best, provide audible notification of a sensor trigger (e.g., beeping if a door is opened), and may provide 'panic' button connectivity to the call center. The manual arming and disarming of the system is onerous to many users, resulting in infrequent use or abandonment of the system altogether. When armed, the system blindly sends an alarm if a sensor is triggered without disarming within a prerequisite time. There is no determination of reasonableness (e.g., as when an alarm is triggered when an internal motion sensor is activated; however, none of the exterior windows or doors were opened), which lead to many false alarms. Even with smart home security monitoring and alert systems, there is still the notion of the system needing to be armed or disarmed; that is, the system must be actively armed to provide security.

New advances in the field have shifted the burden of arming and disarming from a manual operation to an automated one, owing to techniques such as monitoring of wireless sensor inputs, for example, geographical location (geolocation) of mobile devices through Global System for Mobile Communications (GSM) data, or detection of pre- paired wireless signals between on-person mobile devices and a security system's threshold monitoring device (e.g., wall-mounted security panel). However, the system must still be 'armed' to provide any security intrusion value, whether the arming is automated, manual, or a combination of the two. Furthermore, such systems are limited to monitoring and taking action based on an alarm or security event. What is needed is a monitoring and control system that monitors and takes action based on an event, whether an alarm or security event or otherwise, and that considers additional factors, input, and outputs, besides a sensed event, in taking appropriate action.

BRIEF DESCRIPTION OF THE DRAWINGS

Embodiments are illustrated by way of example, and not by way of limitation, and can be more fully understood with reference to the following detailed description when considered in connection with the figures in which:

FIG. 2 is a state diagram in accordance with an embodiment of the invention;
FIG. 7 illustrates a relationship between various variables in a calculation performed in accordance with an embodiment of the invention.

DETAILED DESCRIPTION

Definitions

Figure 1A:
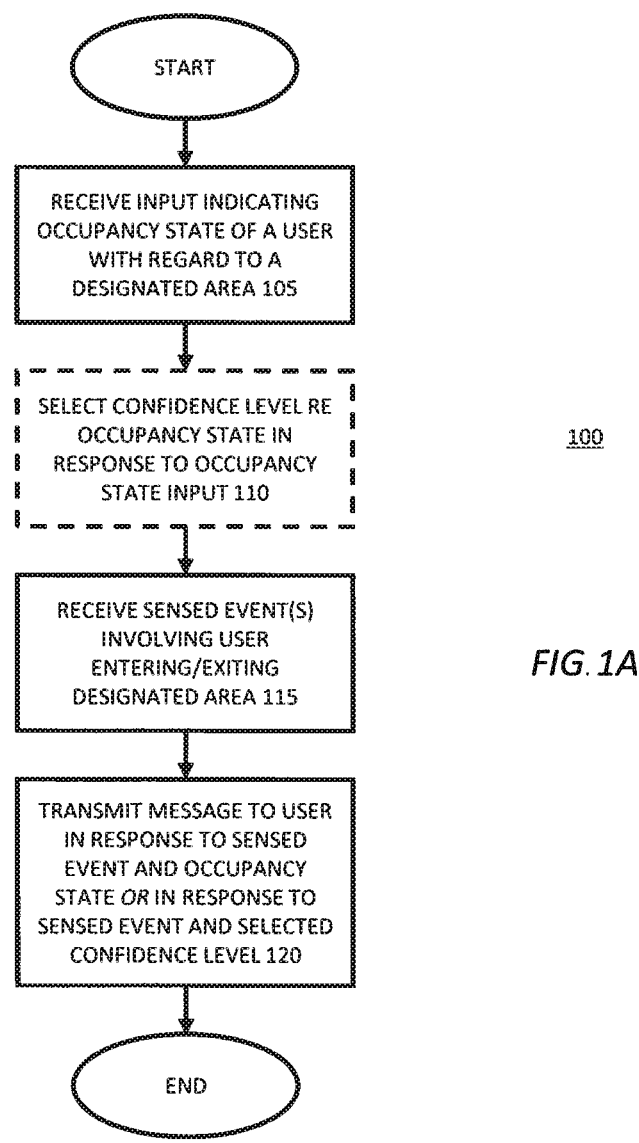
FIG. 1A is a flowchart of an embodiment of the invention.

The detailed description references the following terms, as defined below.

Sensor

A sensor, sensing device, or sensing capable device, is a device, module, or subsystem whose purpose is to detect events or changes in an environment and send the information to other electronics, frequently a computer processor. A sensor is used with other electronics, from something as simple as a light to something as complex as a computer. "Sensor" as used hereinafter, is intended to refer to either a dedicated sensor, a sensing device, or a device with sensing capability.

Sensors are the eyes and ears of a monitoring and control system, such as a security system, providing a significant proportion of information about the state of a designated area, such as a building, the position and status of various properties of the designated area (e.g., building) and about the current occupancy of the designated area/building. The information provided by an individual sensor is at a point-in-time. Learning longer term trends and patterns from the sensor data is typically done by other components, such as a computer subsystem.

Embodiments of the invention categorize sensors into three classes: occupancy, alert and environmental. Some sensors can belong to more than one of these classes, in particular, depending on their deployment and manner of use.

Occupancy Sensor

Occupancy sensors are a class of sensors that provide embodiments of the invention with information about the current occupancy state of the building. An occupancy sensor is an indoor motion detecting device used to detect the presence of a live body, e.g., an animal or person, to automatically control operation of a system, such as security, lighting, or temperature or ventilation systems for a building. Occupancy sensors may use infrared, ultrasonic, microwave, or other technology. The term encompasses devices as different as passive infrared (PIR) sensors, hotel room keycard locks and smart meters. The operating principles of an occupancy sensor take into consideration that all objects with a temperature above absolute zero emit heat energy in the form of radiation. Usually this radiation isn't visible to the human eye because it radiates at infrared wavelengths, but it can be detected by electronic devices designed for such a purpose. The term passive in this instance refers to the fact that PIR devices do not generate or radiate energy for detection purposes. They work entirely by detecting infrared radiation emitted by or reflected from objects. They do not detect or measure heat.

Embodiments of the invention contemplate a variety of occupancy sensor types, such as but not limited to:

Passive Infrared (PIR) sensors, which work on heat difference detection, measuring infrared radiation. Inside the device is a pyroelectric sensor which can detect the sudden presence of objects (such as humans) who radiate a temperature different from the temperature of the background, such as the room temperature of a wall.

Environmental sensors, such as temperature, humidity, smoke and CO2 sensors, which detect the change in the environment due to the presence of a animal such as a human.

Ultrasonic sensors, similar to radar, that work on the Doppler shift principle. An ultrasonic sensor sends high frequency sound waves in an area and checks for their reflected patterns. If the reflected pattern is changing continuously then it assumes that there is occupancy. If the reflected pattern is the same for a preset time period then the sensor assumes there is no occupancy.

Microwave sensors, which are similar to the ultrasonic sensor, and also work on the Doppler shift principle. A microwave sensor sends high frequency microwaves in an area and will check for their reflected patterns. If the reflected pattern is changing continuously then it assumes that there is occupancy. If the reflected pattern is the same for a preset time then the sensor assumes there is no occupancy. A microwave sensor has high sensitivity as well as detection range compared to other types of sensors.

Keycard light slots, used in a hotel energy management system to detect when a hotel room is occupied, by requiring the guest to place their keycard in a slot to activate systems such as lights, thermostats, and security.

Smart meters, which work by detecting the change in power consumption patterns that exhibit distinct characteristics for occupied and vacant states.

Door operated switch.

Audio detection.

Biometric sensors, which measure and analyze unique physical or behavioral characteristics, such as fingerprint, facial features, gestures, voice, pulse rate, blood pressure, etc., which can be used to compare against historical averages and indicate potential medical emergency condition.

Siren.

Key fobs, which are a class of physical security tokens that includes smart cards, proximity cards and biometric keyless entry fobs. Hardware tokens are often small enough for one to store on a key ring, in their wallet or in their pocket.

Keypad PIN.

Exterior motion curtain sensor—typically a PIR sensor with a focused field of view, using infrared for heat detection of an object (e.g., person) otherwise obscured or hidden behind shrubbery and trees.

Camera motion detection.

Radiofrequency motion detection.

Remote control device infrared signal detection.

Initiation or discontinuation of wireless communications including but not limited to a Bluetooth pairing, a Wi-Fi connection, or cellular communication.

Alert Sensor

An alert sensor is a class of sensor that provides notification of an event about a specific property of a building. In some cases, this alert may necessitate an immediate response by the monitoring and control system, or user thereof. Alert sensors include:

Contact sensor. Contact sensors, which provide notification if something is open or closed. They're typically installed on doors, windows, drawers (including freezer drawer), valuables (a safe or jewelry box), a gate to a yard or swimming pool, throughout a building. They have two components: one installed on the door, window, gate, or drawer itself; the other installed next to it on a jamb or frame. When the door, window, gate, or drawer is opened and the components separate and move apart, the contact sensor signals 'open' to the monitoring and control system. In embodiments of the invention, a contact sensor's status (open or closed) can generate real-time alerts that a door is opened or closed in the building.

Glass break sensor.

Water, water flow, flood detection sensor.

Temperature/heat, smoke, natural gas, and carbon dioxide (CO2) sensors.

Door or window frame temperature sensor/thermostat.

Wireless (radio frequency (RF), wi-fi, cellular, Bluetooth) jamming, interception, rogue access point, wi-phishing, or amplification detection sensor.

Environmental sensors, which provide data about various local environmental properties in or near a designated area, such as a building. Environmental sensors include temperature and/or thermostat sensors, humidity sensors, smoke and CO2 detection sensors.

Geofence/Geofencing

A geo-fence is a virtual perimeter for a real-world geographic area. A geo-fence can be dynamically generated, as in a radius around a point location, or a geo-fence can be a predefined set of boundaries (such as school zones or neighborhood boundaries). The use of a geo-fence is called geo-fencing, and one example of usage involves a location-aware device of a location-based service (LBS) user entering or exiting a geo-fence. This activity could trigger an alert to the device's user as well as messaging to the geo-fence operator. This information, which could contain the location of the device, could be sent to an application executing on a computer, a mobile telephone, a mobile communications device, or to an email account.

Geofencing may be used to track location of a person, such as a young child, or a person afflicted with Alzheimer's disease, dementia, or memory loss, so someone can be notified if the tracked location of the person indicates the person is leaving or has left a designated area.

Geofencing allows users of a monitoring and control system to draw zones around places, such as places of work, customer's sites and secure areas. These geo-fences when crossed by an equipped vehicle or person can trigger a warning to the user or operator via a short message service (SMS) or e-mail. In some companies, geofencing is used by the human resource department to monitor employees working in special locations especially those doing field work. Using a geofencing tool, an employee is allowed to log his or her attendance using a GPS-enabled device when within a designated perimeter. Other geofencing applications include sending an alert if a vehicle is stolen and notifying authorities when wildlife stray into farmland or approach an area such as a campground, or domesticated animals stray outside a designated area.

Geofencing, in a security strategy model, provides security to wireless local area networks. This is done by using predefined borders (e.g., an office space with borders established by positioning technology attached to a specially programmed computer). The office space becomes an authorized location for designated users and wireless mobile devices.

Internet of Things

The Internet of Things (IoT) is the network of physical devices, vehicles, home appliances and other items embedded with electronics, software, sensors, actuators, and connectivity which enables these objects to connect and exchange data. Each thing is uniquely identifiable through its embedded computing system and is able to inter-operate within an internetworking (e.g., Internet) infrastructure. The IoT allows objects to be sensed or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, which encompasses technologies such as smart homes. It is contemplated that embodiments of the invention may be implemented at least in part according to an IoT paradigm.

Thermostat

A thermostat is a component which controls the HVAC system to heat or cool to a desired temperature (i.e., the set point temperature) of a designated area, such as a building, or one or more rooms or areas therein, so that the designated area's temperature is maintained near a desired temperature or setpoint temperature.

Thermostats are used in any device or temperature control system that heats or cools a space to a setpoint temperature, examples include building heating, central heating, air conditioners, HVAC systems, radiant heaters, baseboard/individual room heaters, water heaters, as well as kitchen equipment including ovens and refrigerators, and medical and scientific incubators. Thermostats may be classified as thermostatically controlled loads (TCLs).

A thermostat operates as a "closed loop" control device, as it seeks to reduce the error between the desired setpoint temperature and an ambient temperature measured by a temperature sensor. Sometimes a thermostat combines/co-locates both the temperature sensor and temperature control elements of a temperature control system, such as in an automotive thermostat. In other embodiments, one or more temperatures sensors may be remotely located with respect to the temperature control element and/or user interface for the thermostat. In one embodiment, a monitoring and control system as described herein may be a thermostat.

Detailed Written Description

Figure 4:
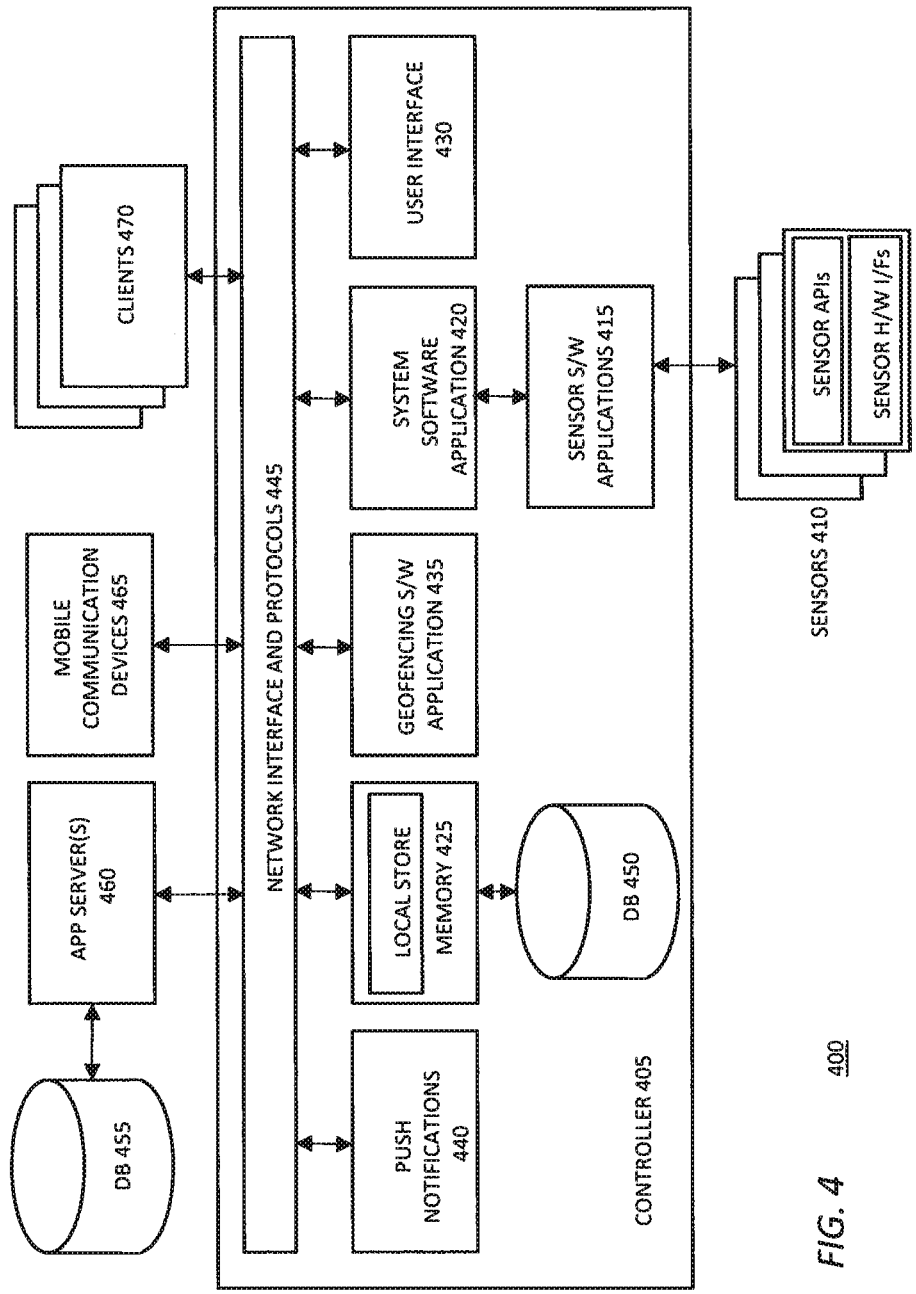
FIG. 4 is a functional block diagram of the computing environment in which an embodiment of the invention may be implemented.
Figure 5:
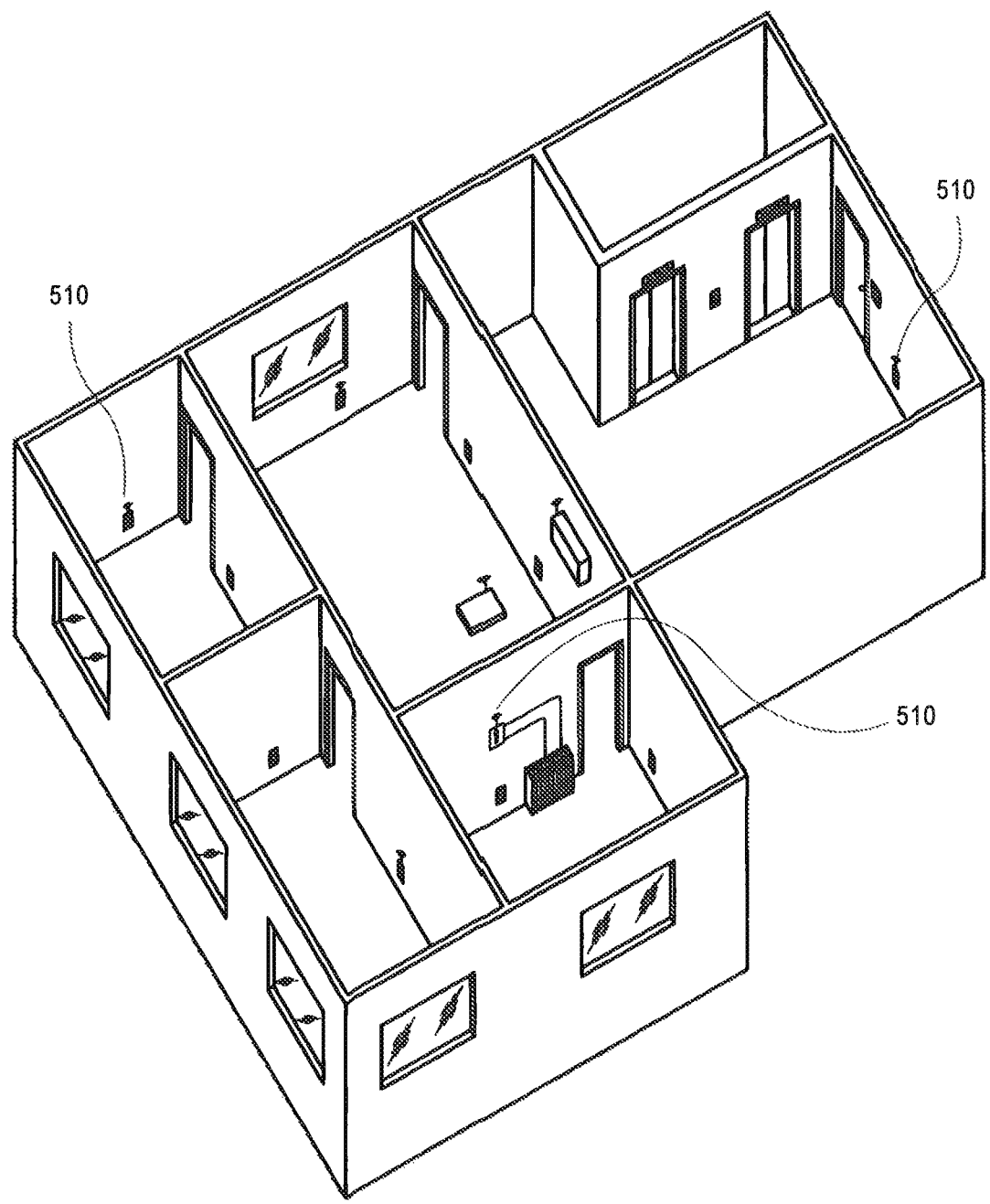
FIG. 5 is an illustration of a plurality of sensors situated in one or more rooms or areas of a designated area, in accordance with an embodiment of the invention.
Figure 6A:
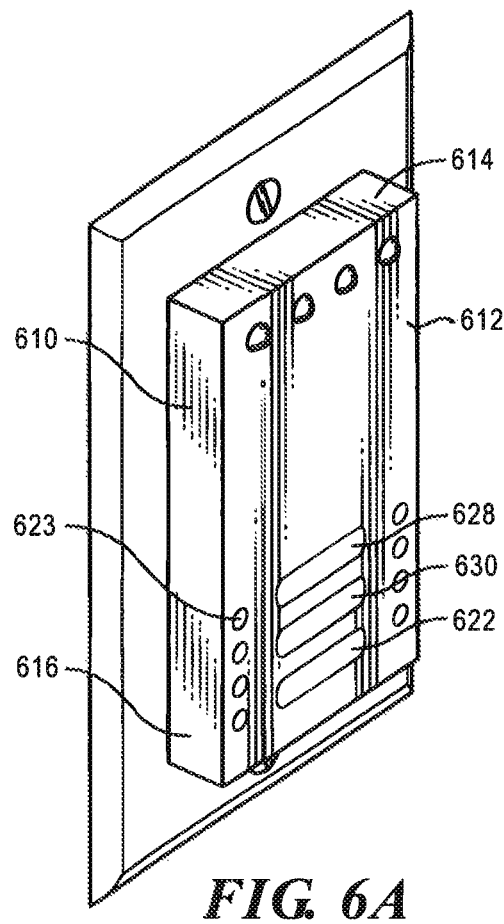
FIG. 6A is a perspective view of a sensing device in accordance with an embodiment of the invention.
Figure 6B:
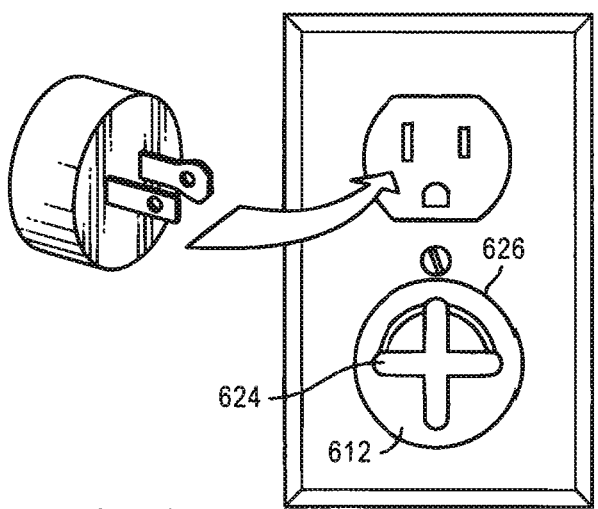
FIG. 6B is a front view of a sensing device in accordance with an embodiment of the invention.
Figure 6C:
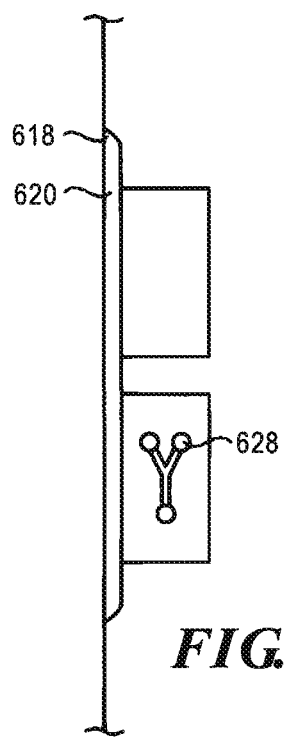
FIG. 6C is a side view of a sensing device in accordance with an embodiment of the invention.
Figure 6D:
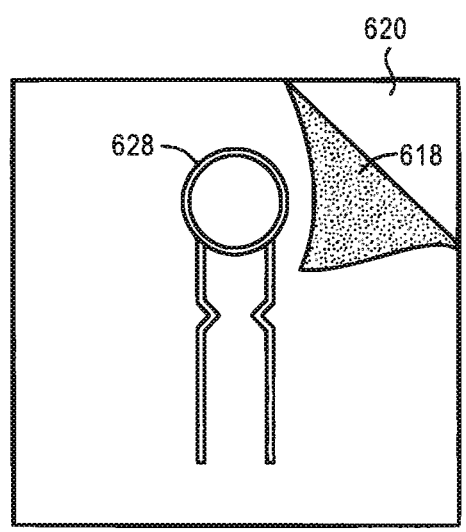
FIG. 6D is a rear view of a sensing device in accordance with an embodiment of the invention.

With reference to FIGS. 1A and 4, embodiments of the invention 100, 400 cause a monitoring and control system to receive input at 105 indicating the occupancy state of, or for, an authenticated user or occupant ("user") with regard to a designated area, such as a house, one or more rooms or areas in the house, a building, one or more rooms or areas in the building, a gated community, a group of buildings, a campus, a public or private venue, a geo-fenced area defining any portion or combination thereof, and any portions or combinations thereof. This input helps inform the monitoring and control system of the likelihood that there are occupants, and in some embodiments, a particular one or more occupants, in the designated area, or in one or more of a plurality of areas therein or portions thereof. Based on this input, the monitoring and control system may, optionally, select, at 110, a confidence level of the occupancy state for the designated area, or for one or more of a plurality of areas therein or portions thereof (box 110 in the flowchart of FIGS. 1A-1G is shown in a dashed line to indicate an optional step in embodiments of the invention). In one embodiment, the confidence level is selected from one of a number of confidence levels regarding occupancy state of a user in the designated area, or one or more of a plurality of areas therein or portions thereof. In one embodiment, the confidence level is selected from one of a number of confidence levels regarding occupancy state of a particular user within or with regard to the designated area, or one or more of a plurality of areas therein or portions thereof. The monitoring and control system receives input at 115 in the form of one or more sensed events, such as, but not limited to, an authenticated user or occupant entering or exiting a designated area of area therein or portion thereof, a potential security or alarm event, or a temperature event (e.g., a measured or detected ambient temperature), from one or more sensors 410 or mobile devices 465 situated within, and/or around, the user and/or the designated area, or within or around one or more of a plurality of areas therein or portions thereof. These sensors or mobile devices may be dedicated to the monitoring and control system, or one or more subsystems thereof (e.g., a temperature monitoring and control subsystem and/or a security alarm subsystem), or may be independent devices with which the monitoring and control system, or subsystem(s) thereof, interacts. In one embodiment, the devices may be owned by or associated with a particular user, and generally kept on or held by the user or in close proximity thereto. The monitoring and control system selects at 120 an action to be taken based on one or more of the sensed events, and the occupancy state obtained at 105 or the selected confidence level obtained at 110 if at all. For example, the monitoring and control system may select at 120 to transmit a message to a particular user based on one or more of the sensed events, and the occupancy state obtained at 105, or the selected confidence level obtained at 110, if at all. It is appreciated that the embodiments of the invention do not require a user or occupant to explicitly arm or turn on the monitoring and control system. Rather, the embodiments continually monitor all the inputs, sensors or otherwise, and then pursue an action to be taken at a point in time, if any.

In one embodiment, where utilized, occupancy state confidence levels may include a lowest confidence level, a low confidence level, a high confidence level, and a highest confidence level. The lowest confidence level may be defined or characterized as one or more occupants on vacation or the designated area is empty/unoccupied, the low confidence level may be defined as the designated area is likely empty or unoccupied, or unoccupied by a particular authenticated user/occupant, the high confidence level may be defined as the designated area is likely occupied, or likely occupied by a particular authenticated user/occupant, and the highest confidence level may be defined as the designated area is, in fact, occupied, or, in fact, occupied by a particular authenticated user/occupant. In other embodiments, there may be fewer or more confidence levels along a continuum from a lowest confidence level to a highest confidence level. The same confidence levels may be applied when considering occupancy of one or more of a plurality of areas or portions of a designated area.

In one embodiment, the monitoring and control system receives input indicating occupancy state of a user with regard to the designated area, or of one or more of a plurality of areas therein or portions thereof, from, for example, a user interface 430, e.g., a keyboard or other input device and a monitor display or other output device coupled in communication with an monitoring and control system controller 405, and/or from one or more sensors 410 and sensor software 415 executing thereon and/or therewith, and/or from one or more mobile communication devices 465.

In one embodiment, the user interface may be via a software application executing on a mobile communication device 465 or user interface 430 of the monitoring and control system, or a programmable keypad and display coupled in communication with a sensor. The monitoring and control system may receive input from one or more authenticated users or individuals via one or more of these user interfaces. For example, an authenticated user may provide input selecting a particular one or more rooms, areas, or portions of the designated area in which the user is or intends to be located for some period of time. Optionally, the authenticated user may provide input that selects a particular one or more sensors in the one or more rooms or portions of the designated area (to the extent the user knows or cares about particular sensor(s) therein), so that the monitoring and control system uses the selected sensor(s) therein as the input. For example, the authenticated user may provide input that selects a particular one or more temperature sensors in the one or more rooms or portions of the designated area (to the extent the user knows or cares about particular temperature sensor(s) therein), so that the monitoring and control system uses the selected temperature sensor(s) therein as the input for measuring temperature for use as input to a temperature control system or one or more thermostats for the designated area.

In one embodiment the thermostat is integrated into or replaced by equivalent circuitry and software in the monitoring and control system. In another embodiment, the thermostat, and/or the temperature sensor(s) to which a thermostat control system is linked, may be located proximate to the controller 400 or may be remotely located with respect to controller 400 and/or one or more sensors in communication with the thermostat and/or monitoring and control system. In one embodiment, the user interface is removed from the thermostat (a "headless" thermostat) and placed in or integrated with a user interface of the monitoring and control system, or controlled by an occupant's mobile communication device and accompanying application software, and information can be relayed to the thermostat by the monitoring and control system and/or the mobile communications device's application software. An example scenario involves a thermostat that receives input from the monitoring and control system, e.g., controller 400, to drive the temperature control locally at the thermostat. In this example, a temperature sensor in a master bedroom detects or measures ambient temperature of 68 degrees Fahrenheit, but the thermostat located elsewhere (e.g., a main hallway) and with its own temperature sensor, detects ambient temperature of 72 degrees. The monitoring and control system, knowing it is nearing bed time (e.g., based on gathered historical and/or current occupancy state data), increases the temperature at the thermostat to 76 degrees, which may well increase temperature across the entire house, but in particular, raise the temperature in the master bedroom to 72 degrees.

In one embodiment, the sensors 410 indicating occupancy state of the user with regard to a designated area, or of one or more of a plurality of areas therein or portions thereof, may be one of three basic types of sensors: an occupancy sensor, an alert sensor, an environmental sensor, or combinations thereof. The alert sensor may be conditional, where an alert is sensed or not based on biometric and/or gesture recognition when a known or an unknown occupant is identified by the system.

With reference to the state diagram 200 depicted in FIG. 2, selection of a confidence level for, or of, an occupancy state at 110 uses multiple inputs at 105, that is, the confidence level of whether one or more authenticated people are in a designated area (for example, whether a house is occupied or empty), is based on potentially numerous inputs. In this regard, authenticated people can be known users—users known to the monitoring and control system, such as a home owner or other individuals that have an account with the monitoring and control system, or guests—users not known to the monitoring and control system, or unable to be identified, but their entry into or exit from the designated area was authorized or approved by an authenticated person, e.g., their entry or exit was detected when another authenticated person was already present in the designated area. In one embodiment, the confidence level of occupancy state is a determination meant to be calculated on an on-going basis and used as possible input in advance of or in addition to the sensors.

The above enumerated confidence levels for occupancy states and the proposed inputs used to determine which confidence level for occupancy state is the current, or selected, confidence level is further described below.

The lowest confidence level of occupancy state 210 is selected when the designated area, or the one or more of a plurality of areas therein or portions thereof, is clearly not occupied by one or more authenticated users. This confidence level is entered by one of the following transitions.

1. By explicit command entered at 250 by an authenticated user, for example, via a user interface. This user may be authenticated by a pin, fingerprint biometrics, facial or gesture recognition detection. The confidence level 210 may be entered immediately or after a set time interval has elapsed.

2. By explicit command entered at 250 by an authenticated user, for example, via a mobile app, that all authenticated users are leaving the designated area, or the one or more of a plurality of areas therein or portions thereof. The confidence level 210 may be entered immediately or after a set time interval has elapsed.

3. An exit from the designated area is detected and the designated area appears empty. For example, an exterior door closes (regardless of the time interval between opening and closing the door, or whether a door open event was detected), there are no identified occupants present, no further motion is detected in the designated area for a time period specified by a configurable parameter, referred to herein as a sensitivity for no motion detection after exit parameter. The confidence level 210 is entered in this scenario at 252 as a transition from the low confidence level of occupancy state 215.

4. A lack of motion detection in the designated area, as happens when there are no identified occupants present in the designated area, and no motion has occurred for a time period specified by the configurable parameter such as the sensitivity for no motion detection after exit parameter. The confidence level 210 is entered in this scenario at 252 as a transition from the low confidence level of occupancy state 215.

The low confidence level of occupancy state 215 is selected when the designated area, or the one or more of a plurality of areas therein or portions thereof, is likely not occupied by one or more authenticated users. This confidence level is entered by one of the following transitions.

1. An exit from the designated area was detected and the designated area appears empty, such as when an exterior door closes (regardless of the time interval between opening and closing the door, or whether the open door event was detected), there are no identified users present, and no further motion is detected in the designated area for a minimum threshold portion (e.g., 50%) of the time period specified by the configurable sensitivity for no motion detection after exit parameter. This confidence level may be entered at 256 from the highest confidence level of occupancy state 225, or entered at 254 from the high confidence level of occupancy state 220.

2. Motion has not been detected for an extended period of time, which is characterized by no identified occupants present in the designated area, and no motion detection has occurred for a minimum threshold of a time period, e.g., 75% of the time period specified by a configurable parameter, referred to herein as the sensitivity for no motion detection for an extended period of time parameter. This confidence level may be entered at 254 from the high confidence level of occupancy state 220.

The high confidence level of occupancy state 220 is selected when the designated area, or the one or more of a plurality of areas therein or portions thereof, likely is occupied by one or more authenticated users. This confidence level is entered by the following transition: motion has not been detected for a moderate period of time, which is characterized by no identified occupants present in the designated area, and, since last entering the highest confidence level of occupancy state 225, no motion detection has occurred for a minimum threshold of a time period, e.g., 50% of the time period specified by the configurable sensitivity for no motion detection for an extended period of time parameter. This confidence level may be entered at 260 from the highest confidence level of occupancy state 225.

The highest confidence level of occupancy state 225 is selected when the designated area, or the one or more of a plurality of areas therein or portions thereof, is occupied by one or more authenticated users. This confidence level is entered by one of the following transitions.

1. A location for a mobile communications device indicates that an individual is very close to, or in, the designated area, characterized by a least one authenticated user's mobile communication device (e.g., mobile phone) has been detected in the designated area, e.g., connected to a home's local area wireless network, or connected via Bluetooth to the monitoring and control system, and/or at least one user's mobile communications device reported entering a geofence erected around the designated area, e.g., a home's exterior, or a master bedroom. This confidence level may be entered at 262 from the high confidence level of occupancy state, at 258 from the low confidence level of occupancy state 215, or at 264 from the lowest confidence level of occupancy state 210.

2. Authentication by a user via a user interface for the monitoring and control system, e.g., a display panel for the monitoring and control system. For example, an authenticated user may enter an explicit command at 268 via the user interface. In one embodiment, the authenticated user inputs a particular one or more rooms or portions of the designated area, or sensor(s) therein, so that the embodiment uses the sensor(s) therein as the input for a monitoring and control system for the designated area. For example, in one embodiment, the authenticated user may input a particular one or more rooms or portions of the designated area, or temperature sensor(s) therein, so that the embodiment uses the temperature sensor(s) therein to measure temperature for use as input to a temperature control system or one or more thermostats for the designated area. The user may be authenticated by a pin, fingerprint biometrics, facial or gesture recognition detection. The confidence level 225 may be entered immediately or after a set time interval has elapsed. This confidence level may also be entered at 262 from the high confidence level of occupancy state, at 258 from the low confidence level of occupancy state 215, or at 264 from the lowest confidence level of occupancy state 210.

3. Recent motion is detected in the designated area, e.g., a house, characterized by, since last entering this state, motion being detected within a minimum threshold of time, e.g., half of the time period specified by the configurable sensitivity for no motion for an extended period of time parameter. This confidence level is entered at 266 from the highest confidence level of occupancy state, or at 262 from the high confidence level of occupancy state 220.

One embodiment of the invention further contemplates tracking one or more identified users ("identified user tracking"). For each user identified in the designated area, or in the one or more of a plurality of areas therein or portions thereof, the monitoring and control system attempts to track their presence. According to one embodiment, different users can be given or configured with different priority or precedence settings so that the monitoring and control system takes an action based on the user or occupant with the highest precedence, or based on the relative precedence of multiple occupants. An identified user's presence is set to "away" from the designated area when the monitoring and control system transitions to the lowest confidence level of occupancy state 210 and presumes at least that individual is, or all individuals are, no longer on the designated premises (e.g., no longer in the house, or a room therein).

An identified user's presence may also be set to "away" from the designated area when the user's mobile communication device's location explicitly indicates the identified user is not in the designated area, including, for example, when the mobile communication device was, but no longer is, connected to a local Wi-Fi or Bluetooth network within or encompassing the designated area, or the identified user's mobile communication device, since the time the identified user was detected as in the designated area, is now reporting live triangulation or geolocation information that indicates the identified user is away from the designated area. An identified user's presence may also be set to "away" from the designated area when schedule guidance/inputs from an authenticated user, e.g., a home owner, explicitly flag an identified user's mobile communications device as off line, powered off, or otherwise not reliable, or indicate the user has left the designated area. Finally, an identified user's presence may also be set to "away" from the designated area when the identified user has been authenticated by another monitoring and control system that is physically separate from this monitoring and control system.

An identified user's presence is set to "present" in the designated area, or in one or more of a plurality of areas therein or portions thereof, upon a successful authentication of the identified user at a user interface of the monitoring and control system, such as at a panel or keypad located inside or at the security perimeter of the designated area, or located at the one or more of a plurality of areas therein or portions thereof. Likewise, an identified user is marked as "present" in the designated area when their mobile communication device's triangulation or geolocation information indicates the user is very close to, or within the designated area, such as when the mobile communication device is detected within the designated area, e.g., connected to a local wireless network, or a Bluetooth radio connection with the monitoring and control system, or the mobile communication device reports entering a geofence erected around the perimeter of the designated area (e.g., the exterior of a home).

Embodiments can further detect the presence of individuals in a building through detection of the interaction of individuals with radio frequency (RF) signals. RF signals can be used to detect the presence of individuals through distinguishing identifying characteristics, such as flesh or body mass composition versus other types of matter. Interference with moving bodies on RF fields can be used to detect movement of individuals. When individuals are identified through RF field analysis or other means, embodiments use other inputs to determine if the individuals are authorized or unauthorized occupants. When the system is indeterminate, it will challenge for authentication through various means through direct system components (e.g., security panels) or known peripheral devices (e.g., smart mobile devices), including such means as: biometric recognition (finger print, facial, retinal, etc.), verbal recognition (voice matching or phrase matching), pattern recognition (pin, gesture recognition, swipe pattern), etc.

In addition, where sensors used to monitor RF interference or organic material presence are placed in one or more locations throughout the building to determine the presence of individuals, these sensors can be multi-purpose to include other functionality which are complimentary to the system (thermal sensor, biometric readers, cameras, microphones/noise detection sensors, speaker, light detectors, humidity detectors). Further, for such sensors which may be plugged into wall outlets, these can have pass-through outlets which are controlled by the system; for example, if an intruder is determined to be a room, the outlet through which a lamp is connected can be turned on (to frighten the intruder) or off (to confuse the intruder) as predetermined by the system.

With regard to the gesture recognition detection mentioned above, in one embodiment, gesture recognition and authentication is enabled. The gesture recognition system can be touch-based or visual (camera)-based. In addition, the system can use the gesture recognition capability of mobile devices (e.g., smart phones and tablets) which are known to, and linked to, the system. Gestures can be preset or user-defined, and user defined gestures can be universal or individualized. The system is configured with a digital signal processor and memory component which contains a pre-programmed algorithm of user gestures to indicate various command signals. For example, the digital signal processor may transmit an emergency message to request emergency response based on a particular user gesture: one for medical distress, another for police response, etc. A particular gesture, either pre-set or user-defined, may be used to authenticate an individual as a known person to the system. Personalized unique gestures can be used to authenticate specific individuals in an authorization request. Specific gestures may also be used to as a method of user system control, either as a UI menu navigation methodology or as a preset commands, such as start displaying a photo album, put the system in a particular monitoring state, start or stop a siren, control ancillary connected devices such as security lighting, locks, audio, etc.

Embodiments of the invention, when used to detect gestures commands, first detect human figures within a recorded image. If there are no human figures detected, a video camera continues to process frames of recorded video. However if a human figure is detected then the embodiments may further process sounds or outlines to determine if a gesture was sensed. For example, when used for gesture recognition, embodiments may have a plurality of commands corresponding to a hostile gesture such as arm raised in the air. In conjunction with the outline matching, an embodiment may have a band pass filter to filter specific sounds frequencies to determine if a hostile threat such as a loud voice from an undesignated user or gunfire is sensed.

In general, the gesture or voice recognition is defined by a threshold level. In the context of a voice recognition, the threshold level may be set to only loud voices from undesignated users. In the context of gesture recognition, the threshold level may be defined by the speed in which a designated user's hands are raised/lowered in the air or the length of time they remain raised. The pre-defined actions may be programmed during a "learned mode" and specific to each designated user. These pre-defined actions may include overt gestures to provide a sign of duress and cause an immediate condition. In a further example, embodiments may be programmed to recognize a weapon such as a pistol or a knife. Further, embodiments may provide a defined "threat value" to different gestures or objects. For example, one embodiment may determine that an undesignated user is carrying a knife and provide a higher threat value than if they were carrying tools or toys. Alternatively, one designated user may pre-define repetitive actions such as repeatedly placing their hands over their eyes or nose as their unique and overt act of gesturing duress.

In another context, such as biometrics, one embodiment may be configured to recognize specific measurements within a designated user face or recognize a specific heat signature. The biometric data may be assigned a threat value and if that value exceeds a specific threshold, cause a condition to the system such as an alarm. In another example, a designated user may be approached by a stranger when trying to enter the home and provide a pre-defined overt gesture.

Figure 1B:
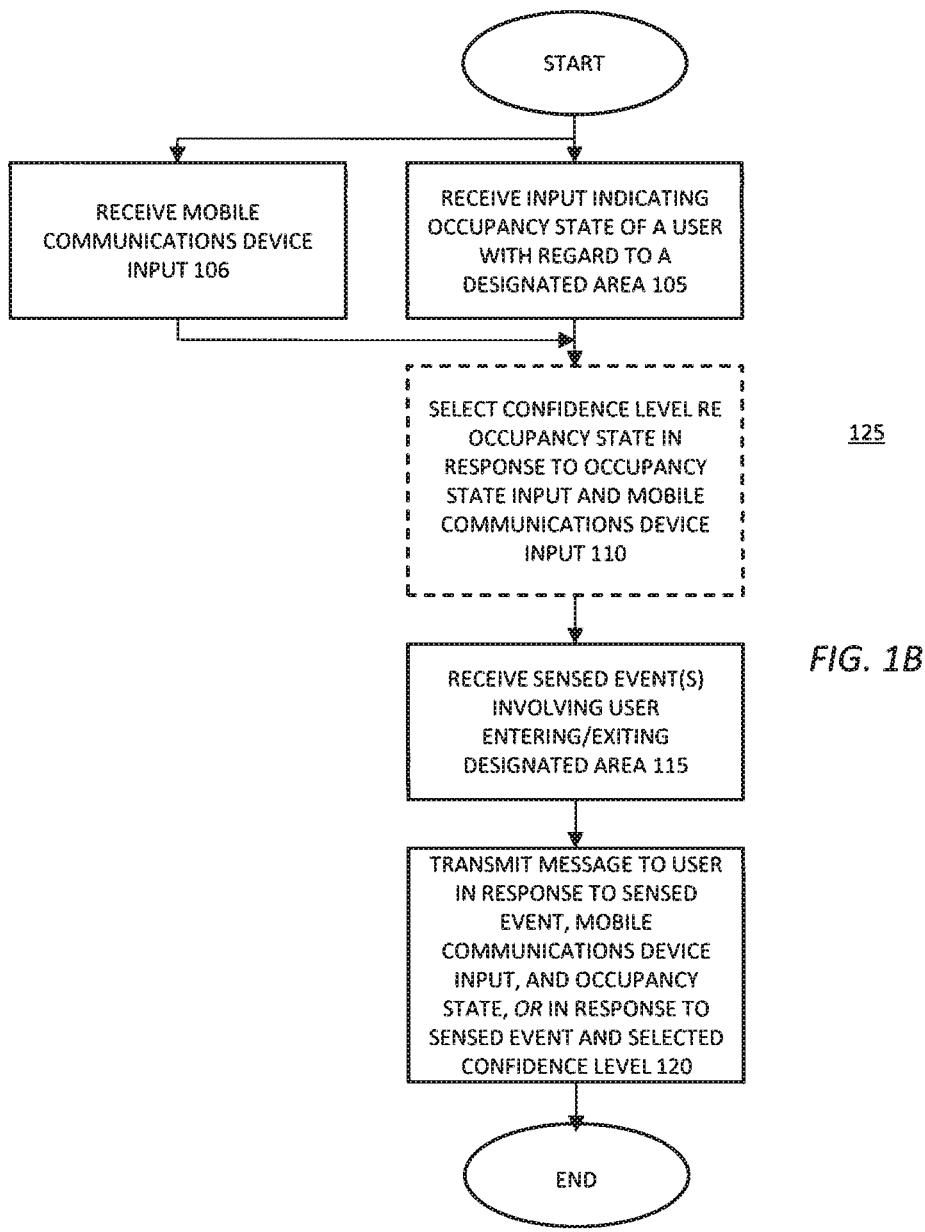
FIG. 1B is a flowchart of an embodiment of the invention.

With reference to FIGS. 1B and 4, one embodiment of the invention 125, 400 receives additional input in the form of geofencing or geolocation information transmitted from one or more mobile communication devices 465 within or around a particular user and/or the designated area. In one embodiment, a geofencing software application executing on the controller 405 receives this additional input. In this embodiment, the monitoring and control system may select one of the confidence levels regarding occupancy state of a user with regard to the designated area, that is, select a confidence level indicating whether the user is present in or away from the designated area, further based on the received additional input. In this embodiment, the monitoring and control system receives input at 105 indicating the occupancy state of the user with regard to the designated area, as well as geolocation information input from one or more mobile communication devices at 106, which can inform which one or more particular authenticated users/occupants is in a designated area, or an area therein or portion thereof, or entering or exiting the same. For example, a particular mobile communications device may be known as belonging to, or associated with, a certain authenticated user/occupant, and thus, a strong inference can be drawn, based on geolocation information that identifies the location of a mobile communications device within the designated area, that the authenticated user/occupant within the designated area. Based on both of these inputs, the monitoring and control system may select, at 110, the confidence level. The monitoring and control system receives at 115 input regarding one or more sensed events from one or more sensors 410 or mobile devices 465 situated within or around the designated area, such as sensing a user entering, or exiting a designated area or area therein or portion thereof. The monitoring and control system then selects at 120 an action to be taken based on the one or more of the sensed events, the occupancy state input received at 105, and the mobile communications device(s) input at 106, or based on the one or more of the sensed events and the confidence level selected at 110. For example, the action to be taken may involve transmitting a message to a particular authenticated user/occupant when in, or entering or exiting, the designated area, or an area therein or portion thereof. The message may be transmitted to the user's mobile communications device or a display panel located near the user.

In one embodiment, the mobile communication devices are cellular communications capable mobile devices. In other embodiments, the devices may support or adhere to other wireless communication protocols or standards such as an IEEE 801.11 Wi-Fi communications, Bluetooth wireless communications technology, and global positioning satellite (GPS) communications standards, and communicate triangulation or geolocation information with a geofencing application 435 of the monitoring and control system 400.

Some embodiments on the invention provide a mountable responsive sensing device which may be configured to be releasably mounted to a wall or within an electrical outlet and provide continuous transmission to a remote thermostat or the monitoring and control system. The sensing device is configured to provide environmental sensing (e.g., temperature, humidity etc.) within a pre-determined and geo-fenced location (e.g., a designated area or one or more areas therein or portions thereof) and, more specifically, regulate temperatures within "control zones" of the pre-determined, geo-fenced location. In one embodiment, the sensing device incorporates both motion detection and temperature sensing capabilities. Further, in one embodiment, the sensing device is configured to be used in conjunction with the monitoring and control system to provide continuous transmission of sensed events (e.g., a measured ambient temperature) over a wired or wireless network using an integrated transceiver to the monitoring and control system, which may then control an HVAC or environmental system to reach a desired state (e.g., temperature, humidity, etc.) at the geofenced locations, based, in one embodiment, on pre-programmed conditions. In one embodiment, accurate temperature regulation is possible with the releasably mounted sensors positioned or situated in various locations within a geo-fenced location. The sensors provide highly accurate temperature readings in each location in order for the monitoring and control system, either directly through a thermostat or through an intermediate control device, such as a home control hub or alarm panel, to adjust an HVAC set point until a specific temperature at a specific sensor is achieved. The location of the sensor with which the system is currently working can be varied based on a myriad of predefined conditions, such as time-of-day, occupancy sensing, and other system and non-system inputs into the thermostat or monitoring and control system.

With reference to FIGS. 5, 6A-6D, a sensor 510, 610 is configured to releasably mount to a wall or within an electrical wall outlet (i.e., plug mounted) and form a geofence perimeter around a pre-determined location of a designated area, such as a residential home or commercial office space. It is contemplated the wall mounted and wall plug mounted sensors are configured of a molded synthetic or semi-synthetic material such as a plastic or polyurethane with an approximate height 612 of 3-4 inches, width 614 of 2-3 inches, thickness 616 of ⅛-¼ of an inch. The device 510, 610 may include an adhesive 618 with a waxed paper 620 backing affixed to the adhesive portion 618. The waxed paper 620 is designed to be peeled away from the adhesive 618 before being secured to a wall.

Each of the sensors 510, 610 has a separate power or battery source and a piezoelectric alarm 622 to provide an audible signal when power is received. Alternatively, the sensor 510, 610 may be equipped with a Light Emitting Diode (LED) 623 to provide a visual indicator. Further illustrated in FIG. 6 is the plug mount sensor 610 having an elongated body 624 along the front face. The sensors have a plurality of internal conducts which provide a flexible "Y-shape" configuration. The housing of the sensor 626 further includes a thermistor 628 electrically connected in parallel to a transceiver 630 to provide a responsive signal to at least a thermostat and/or the monitoring and control system upon the detection of a heat source or upon measurement of the ambient temperature. Further, it is contemplated the thermistor may be used to detect low or high temperatures and provide a signal over the wireless network to control the applicable thermostat.

The transceiver is configured to receive defined user inputs and control system input signals from both the monitoring and control system and a smart mobile communications device. The sensor 510, 610 further enables geofencing and multi-zone proximity sensing which allows a defined or authenticated user to move between "control zones" within the defined geo-fenced location and experience a uniform programmed temperature.

The sensor 510 610 is further configured to continuously receive wireless data over at least Z-Wave, ZigBee, Wi-Fi, sub-GHz, BlueTooth, BlueTooth Mesh, etc. from the monitoring and control system, in one embodiment, corresponding to defined user inputs. For example, the sensor 510, 610 may receive a signal from a first user's mobile communications device containing the first user's desired temperature during the day and at night. The sensor may then adjust the defined zones of the geo-fenced location to ensure the preferred daytime and night time temperatures are maintained. Further sensor 510, 610 is configured to sense when a defined user has exited the defined geo-fenced location to provide an "away" setting. Once the defined user's temperature preference is received the transceiver is configured to provide incremental adjustments at each of the zones of the defined geo-fenced location.

Thus, embodiments of invention consist of a number of releasably mounted environmental sensing devices (temperature, humidity, etc.) which measure current states in a geo-fenced area and communicate any significantly incremental change of state to a central monitoring and control system, including, for example, a thermostat, security panel or home automation hub. The central monitoring and control system can subsequently control the environmental systems (HVAC, humidifier, etc.) to equilibrate environmental conditions to a user-desired set point associated with a specific geo-fenced area by continuously monitoring the output of the sensor coexistent in that area. The system can vary the targeted area throughout a cycle period (such as during the course of a day) based on user preferences or other system and non-system inputs, such as time of day, area occupancy status, etc. If the central monitoring and control device is itself a thermostat, the thermostat itself would directly control the environmental systems (HVAC, humidifier, etc.). If the central monitoring and control system is an intermediate device which sits between the sensing devices and a thermostat, the central monitoring and control system equilibrates to the desired set point by directly altering the set points on the thermostat itself. Alternatively, the thermostat can itself be built directly into the central monitoring and control device, such as a home automation hub or security panel. Note that the temperature sensing capability on the thermostat is, itself, a default sensing device in this embodiment.

Figure 1C:
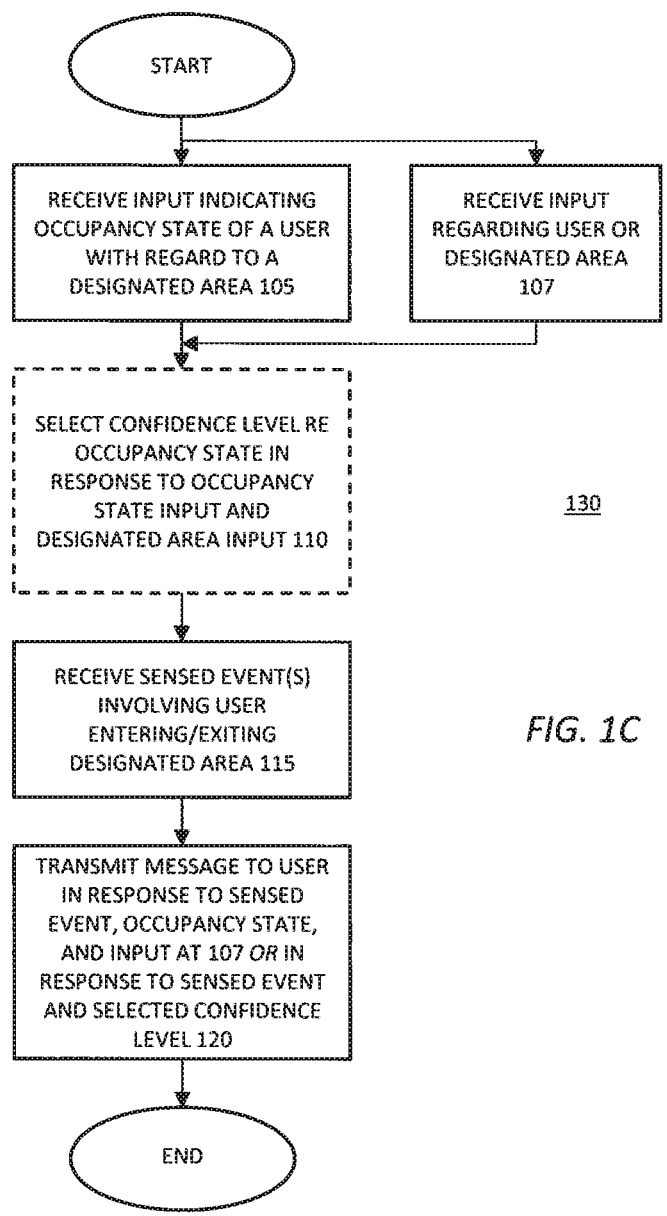
FIG. 1C is a flowchart of an embodiment of the invention.

With reference to FIGS. 1C and 4, one embodiment of the invention 130 receives additional input (e.g., user input) or otherwise learns about information relevant to or about one or more users and/or the designated area (e.g., using machine learning) at 107, wherein the additional input or learned information is, for example, one or more of: user input selecting a particular one or more rooms, or areas, or portions of the designated area, or temperature sensor(s) therein (to the extent the user knows or cares about particular temperature sensor(s) therein), so that the embodiment uses the temperature sensor(s) therein as the input for measuring temperature for a temperature control system or one or more thermostats for the designated area; learned occupancy schedule (work/school/other of various occupants, e.g., building service personnel on-site patterns); pattern of where and/or when mobile communication devices are present (based on such devices being on the person of an occupant within the designated area), in or absent from, the designated area; time of day; day of week; seasonal-, holiday-, or personal observances or patterns of various occupants; current weather conditions; adverse and/or extreme weather conditions. This information could be explicitly input at one or more of user interfaces 430, received via sensors 410, or received via mobile communication devices 465. In this embodiment, the monitoring and control system may optionally select one of the confidence levels regarding occupancy state of a user with regard to the designated area further based on the received additional input. In this embodiment, the monitoring and control system receives input at 105 indicating the occupancy state for a user with regard to the designated area, as well as receives input regarding additional relevant information about the user and/or designated area, at 107. Based on these inputs, the monitoring and control system may select, at 110, the confidence level. The monitoring and control system receives at 115 one or more sensed events from one or more sensors 410 or mobile devices 465 situated within or around the designated area, such as a user entering or exiting the designated area, or otherwise detected as present in or away from the designated area. The monitoring and control system then selects at 120 an action to be taken based on the one or more sensed events, and the selected confidence level, or based on the one or more sensed events, the occupancy state of one or more users, and the input regarding additional relevant information about the designated area from step 107. For example, the action taken may involve transmitting a message to one or more users in, or away from, the designated area, based on the inputs.

The additional input about information relevant to or about one or more users and/or the designated area, or the one or more of a plurality of areas therein or portions thereof, received at 107 can be thought of as learned behavior qualifiers to the input received at 105, for example, from sensors 410. This information may be considered and provided as a weighting to the occupancy state of one or more users. Specifically, in one embodiment, the weighting that is applied to the occupancy state of a user with regard to the designated area essentially is itself a level of confidence that the occupancy of the user is expected, anticipated or otherwise behavior that has been learned by the system to be considered normal ("Learned Behavior Confidence", or "LBC"). The learned behavior confidence, in one embodiment, is a value that ranges from 0 to 100, where 0 represents no learned behavior confidence that the occupancy state of the user is expected, anticipated or otherwise normal, up to where 100 represents that occupancy state of the user is completely expected, anticipated or otherwise normal.

An embodiment of the invention may consider the learned behavior confidence when selecting the confidence level at 110, if at all, and elevate or reduce the selected confidence level 110.

The following description enumerates learned behavior qualifiers and how each may impact the value of the learned behavior confidence weighting:

Time of day: if the occupancy state of the user occurred and during the last time period (e.g., 30 days—adjustable time period) there was a similar occupancy state (same target and target area) during the same time window (half hour before and after—adjustable window) then the LBC is weighted with the number of days this occurred out of the time period.

Learned schedule (work/school/other): pattern of when mobile communication devices (respectively associated or assigned to particular occupants) are present or absent from the designated area/day of week. If the indicated occupancy state of the user occurs while the confidence level regarding the occupancy state of the user is currently at its lowest confidence or low confidence level, and during the last time period (30 days—adjustable time period) there were: one or more mobile communication devices present on at least three of the preceding same day of the week, or confidence level regarding the occupancy state of the user for the designated area was at the highest level on at least three of the preceding same days of the week, then the LBC is set to the percentage with the number of days that the behavior was present on this specific day of the week in the last preceding 6-month time window.

Service personnel patterns: this is handled in a manner similar to the above described learned schedule.

Seasonal observances and/or holidays—discount the learned schedule. In one embodiment, these items cause the learned schedule to not be applied, or may reduce the weighting by it a certain percentage.

Adverse current weather conditions, extreme temperature: if the occupancy state of a user occurs while the confidence level of the occupancy state is currently at the lowest confidence level or low confidence level, and the current weather conditions are currently abnormal (tornado, blizzard, etc.) or the temperate can be considered extreme for the area (either cold or hot extremes), then set LBC to 50 percent on the assumption that individuals may be in the designated area (e.g., a house) that otherwise would be outside or working.

In the above described embodiments illustrated in the flow charts of FIGS. 1A-1C, the step of receiving a sensed event from one or more of a number of sensors at 115 contemplates using sensor inputs from the sensors monitoring the designated area to determine an event that is occurring in, around or outside of the designated area at a current point in time, such as an individual entering or exiting the designated area, or otherwise detected as being present in, or away from, the designated area. Events may be triggered through a single sensor input, or a more complex layering of events over a short period of time, which may be triggered repeatedly through a single sensor input, or multiple triggers caused by sensor input from different sensors. Further, in some embodiments, there may be more than one event under evaluation or construction at a point in time, though not all necessarily are confirmed as actual events.

In one embodiment, events are not based on, and do not accept, user input. Any user input is requested and handled in determining or selecting the action to be taken in response to the event and, optionally, the selected confidence level. After receiving and processing user input, some actions to take in response to one or more events may require additional clarification through waiting for additional sensor data. It is contemplated that this process will be handled according to, and as part of, the particular action to be taken.

Embodiments of the invention are able to combine a number of sensors, or sensor inputs, typically in a progressive manner, to obtain a more nuanced view of the event. In one embodiment, as a baseline, the monitoring and control system monitors a single sensor, e.g., an alarm or security sensor, and/or a temperature sensor. In an alarm system, typically, this single sensor is a perimeter sensor, such as a door or window sensor. Given the binary nature of this sensor input, it is not possible to further understand a sensed event, e.g., a potential alarm event, in this situation other than as a singular open/close event. However, by combining multiple sensors, or sensor inputs, embodiments are able to obtain a greater understanding of the potential alarm event. For example, combining an external motion sensor with a door or window contact may allow an embodiment to ascertain that there is a building envelop penetration that originated from outside the building. With this greater understanding, more nuanced action(s) can be taken for this potential alarm event. Further, it may be possible to deduce potential alarm events when a primary sensor is either not present, unmonitored, or in an open or unknown state. As an example, it is common to leave open a window or door. Typically, it would not be possible to monitor entry of a person through the opening in this situation. However, combining exterior and interior motion detectors on either side of the open window or door allows the monitoring and control system to follow motion from the outside, through the building envelop, and into the interior. The monitoring and control system is then able to provide a nuanced response in terms of the action to be taken, such as alerting a home owner that someone may have entered the home through the open window.

Figure 3:
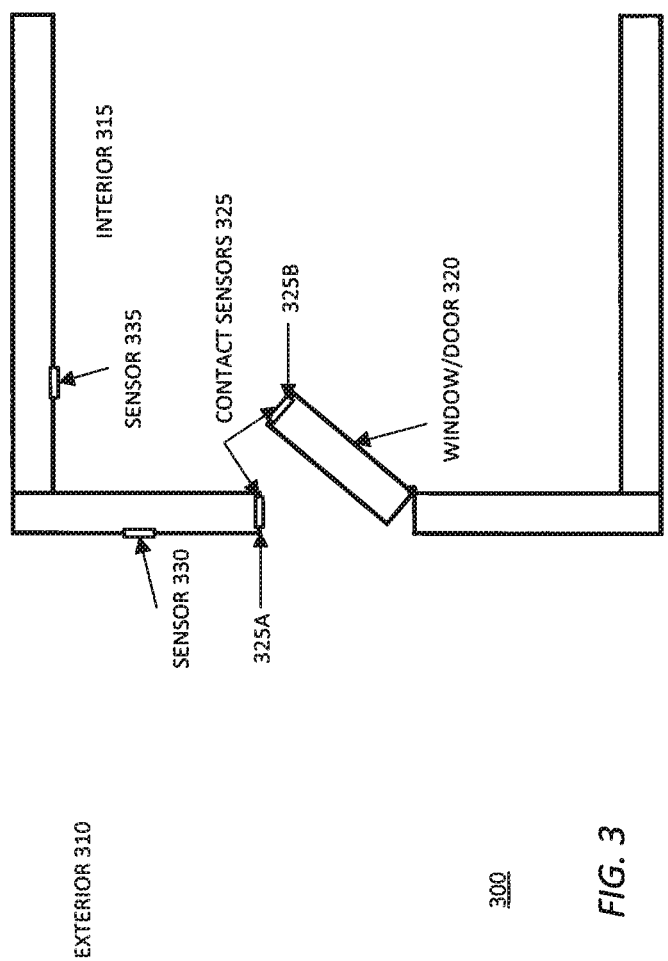
FIG. 3 is an illustration of an environment in which an embodiment of the invention may operate.

As an example, with reference to FIG. 3, in one embodiment 300, a designated area, in this case, the interior 315 of a building, is set up to be monitored for potential alarm events. Note that window or door 320 is open. Typically, it is not possible to monitor entry of a person through this opening in this situation even though contact sensor 325 is installed, including both a sensor 325A on the door or window jamb, and a counterpart sensor 325B on the side or edge of the door or window. However, combining exterior sensor 330 (e.g., a motion detection sensor or video camera) and interior sensor 335 (e.g., a motion detection sensor or video camera) on respective sides of the open window or door allows the monitoring and control system to follow motion from the outside, through the building envelop, and into the interior. The monitoring and control system is then able to provide a nuanced response in terms of the action to be taken, such as alerting a home owner that someone may have entered the home through the open window.

Further in regard to the above described embodiments illustrated in the flow charts of FIGS. 1A-1C, the step of receiving a sensed event from one or more of a number of sensors at 115 includes receiving notification of one or more of the following enumerated potential events, including alarm events:

a typical entry door opened from inside,
a typical entry door opened from outside,
a typical entry door opened,
a non-typical entry door opened from inside,
a non-typical entry door opened from outside,
a non-typical entry door opened,
a non-used entry door opened from inside,
a non-used entry door opened from outside,
a non-used entry door opened,
a possible entry through closed window,
a possible entry through open door,
a window opened from inside,
a window opened from outside,
a window opened,
a possible entry through open window,
a cabinet or drawer opened,
a interior motion sensed,
an exterior motion sensed,
an exterior casing event detected,
a glass breaking detected,
a flood/water detected,
smoke detected,
CO2 gas detected,
a particular individual being tracked entering or exiting a designated area or area therein or portion thereof; and
a particular individual being sensed as present in, away from, a designated area or area therein or portion thereof.

A brief description of each potential alarm event follows.

The typical entry door opened from inside: the criteria for detecting this potential alarm event, with doorway ("Doorway") limited to exterior doorways that have been marked as typically utilized by the users for home ingress or egress, includes motion being detected in an interior area ("Target Area") that contains one or more Doorways, and within a period of time thereof (e.g., 2 minutes), in the Target Area, a door contact that is attached to a Doorway transitions from closed to open ("Target").

The typical entry door opened from outside: the criteria for detecting this potential alarm event, with doorway ("Doorway") limited to exterior doorways that have been marked as typically utilized by the users for home ingress or egress, includes motion being detected in an exterior ("Target Area") that is associated with one or more Doorways, and within a period of time thereof (e.g., 2 minutes), in the Target Area, a door contact that is attached to a Doorway transitions from closed to open ("Target").

The typical entry door opened: the criteria for detecting this potential alarm event, with doorway ("Doorway") limited to exterior doorways that have been marked as typically utilized by the users for home ingress or egress, a door contact that is attached to a Doorway transitions from closed to open ("Target"), and simultaneous to the Target activating, if motion is detected in an interior area ("Target Area") that contains the Target, then also note the Target Area but do not attempt to elevate the event to Typical entry door opened from inside. This is due to the potential of the door swinging open, or a person or object traversing the doorway triggering the interior motion sensor. Note that neither "typical entry door opened from inside" or "typical entry door opened from outside" are in consideration in this event.

The non-typical entry door opened from inside: the criteria for detecting this potential alarm event is the same as the "typical entry door opened from inside", with doorway ("Doorway") limited to exterior doorways that have been marked as not typically or seldom utilized by the users for home ingress or egress.

The non-typical entry door opened from outside: the criteria for detecting this potential alarm event is the same as the "typical entry door opened from outside", with doorway ("Doorway") limited to exterior doorways that have been marked as not typically or seldom utilized by the users for home ingress or egress.

The non-typical entry door opened: the criteria for detecting this potential alarm event is the same as the "typical entry door opened", with doorway ("Doorway") limited to exterior doorways that have been marked as not typically or seldom utilized by the users for home ingress or egress.

The non-used entry door opened from inside: the criteria for detecting this potential alarm event is the same as the "typical entry door opened from inside", with doorway ("Doorway") limited to exterior doorways that have been marked as not utilized by the users for home ingress or egress.

The non-used entry door opened from outside: the criteria for detecting this potential alarm event is the same as the "typical entry door opened from outside", with doorway ("Doorway") limited to exterior doorways that have been marked as not utilized by the users for home ingress or egress.

The non-used entry door opened: the criteria for detecting this potential alarm event is the same as the "typical entry door opened", with doorway ("Doorway") limited to exterior doorways that have been marked as not utilized by the users for home ingress or egress.

The possible entry through open door: the criteria for detecting this potential alarm event includes detecting motion in an exterior area ("Target Area") that contains one or more exterior doors that are currently reporting back open, and within a period of time thereof, e.g., 30 seconds, in the Target Area, motion is detected in an interior area that contains the Target.

The window opened from inside: the criteria for detecting this potential alarm event includes detecting motion in an interior area ("Target Area") that contains one or more exterior windows, and within a period of time thereof, e.g., 2 minutes, in the Target Area, a window contact that is attached to an exterior window transitions from closed to open ("Target")

The window opened from outside: the criteria for detecting this potential alarm event includes detecting motion in an exterior area ("Target Area") that contains one or more exterior windows, and within a period of time thereof, e.g., 2 minutes, in the Target Area, a window contact that is attached to an exterior window transitions from closed to open ("Target").

The window opened: the criteria for detecting this potential alarm event includes a window contact that is attached to an exterior window transitioning from closed to open ("Target").

The possible entry through closed window: the criteria for detecting this potential alarm event includes detecting motion in an exterior area ("Target Area") that contains one or more exterior windows that are currently reporting back closed, and within a period of time thereof, e.g., 2 minutes, in the Target Area, a window contact that is attached to an exterior window transitions from closed to open ("Target"), and within another period of time thereof, e.g., 30 seconds, in the Target Area, motion is detected in an interior area that contains the Target.

The possible entry through open window: the criteria for detecting this potential alarm event includes detecting motion in an exterior area ("Target Area") that contains one or more exterior windows ("Target") that are currently reporting back open, and within a period of time thereof, e.g., 30 seconds, in the Target Area, motion is detected in an interior area that contains the Target.

The cabinet opened: the criteria for detecting this potential alarm event includes a cabinet contact that is attached to a cabinet transitioning from closed to open ("Target").

The interior motion detection sensed: the criteria for detecting this potential alarm event involves detecting motion in an interior area ("Target Area").

The exterior motion sensed: the criteria for detecting this potential alarm event includes detecting motion in an exterior area ("Target Area").

The exterior casing: the criteria for detecting this potential alarm event includes detecting motion in an exterior area ("Target Area"), and within a period of time thereof, e.g., 2 minutes of the last detected Target Area; motion is subsequently detected in another exterior area immediately adjacent to the Target Area; and at least 30%, or at least 3, unique exterior motion sensors are triggered.

In one embodiment, with regard to the step of selecting an action to be taken responsive to the potential event and the occupancy state or the selected confidence level 120, the action to be taken represents the action that could be taken by the monitoring and control system in response to the occurrence of a specific potential event or temperature control event in the designated area for a given occupancy state or confidence level of an occupancy state. The action to be taken may range from no action to be taken, through a simple, single-step response (e.g., send a signal to a temperature control system to turn on a heating/cooling system to adjust temperature in a room when the measured temperature in that room differs from a setpoint temperature configured at one or more thermostats of the temperature control system, or transmit a message to a particular authorized user upon detection of the user entering or exiting the designated area), up to a multi-step response that requires further interaction with multiple parties such as, in the case of a security or alarm system, an unidentified person (a possible intruder), owner(s) of the designated area, or alarm event responders. In one embodiment, actions to be taken are ranked from highest to lowest priority. An action to be taken typically is atomic, meaning that it should be completed to its conclusion. The exception to this is when a higher ranked actions is required by the monitoring and control system, in which case a lower priority action may be suspended in favor of the higher priority action.

Further with regard to the step of selecting an action to be taken responsive to the potential alarm event and the occupancy state of a user with regard to a designated area, or the selected confidence level, one embodiment of the invention contemplates selecting one of the following actions:

No response: the sensed event, e.g., a potential alarm event, is either considered a normal event in the designated area, or otherwise does not warrant notification to or interaction with users. No action is to be taken.

Challenge an individual for authentication: an unknown or unidentified individual has triggered a sensed event. This action challenges the individual to identify themselves and elevate the action to be taken if necessary.

If the learned behavior confidence is at or exceeds some threshold, e.g., 80, then send a notification to all adult users of the monitoring and control system that the following LBC action, or actions are happening and are going to auto-authenticate based on LBC details. The adult users can then confirm or deny the LBC choice.

Broadcast on all connected display panels a request for the individual to identify themselves at a user interface to the monitoring and control system, e.g., at a display panel.

Broadcast to all locally connected mobile communication device applications a notification that an unidentified person may have entered the designated area, or one or more areas therein or portions thereof, and that authentication is required.

If unanswered after a timeout period, e.g., 20 seconds, repeat request.

If unanswered after 20 additional timeout period, then elevate the action to be taken:
  If the learned behavior confidence is above a moderate threshold, e.g., 50 or above, then send a notification to all adult users of the monitoring and control system that an unidentified individual has entered the designated area, giving the reason behind the LBC. An adult user can then confirm or deny the LBC choice.
  Otherwise, elevate the action to be taken to "raise an alarm" and follow through on such actions.

Passively notify designated area (e.g., house) occupants: the corresponding sensed event, e.g., a potential alarm event, while a normal event in the house, is at a high enough priority that it warrants notifying the occupants in a passive manner. For example, in a home without A/C or A/C turned off, when ambient temperature in a master bedroom exceeds temperature outdoors, notify the occupants of such an event. An occupant may elect at that time to open a window in the master bedroom in an attempt to reduce ambient temperature.

Broadcast on all connected user display panels or local mobile communication device applications a passive notification that neither requires a user to respond nor interrupts any current user interface flow. The passive notification may be one of the following, depending on the current settings of the user interface and each individual mobile app: sound a chime; display a toast, or other like temporary text notification, that contains the main event detail, or pulse the area on an avatar of the designated area where the sensed event occurred.

Notify the designated area (e.g., home) owner: the corresponding sensed event, while a normal event in the house, is at a high enough priority that it warrants notifying only the owner ("target users") of the sensed event. The notification is delivered in a way that the information is available if needed, but doesn't impact the user's workflow. Typically, the notification needs to be acknowledged or dismissed by the user.

Broadcast on all connected panels a notification that doesn't requires the user's response: display a toast, or other like temporary text notification, that contains the main event details; pulse the area on the designated area avatar where the sensed event occurred.

Broadcast to all target users' mobile apps a notification. Typically, such notification would be delivered by the monitoring and control system's push notification service 440. For example, a temperature sensor or contact sensor for a deep freezer indicates defrosting will occur at the current measured temperature, or the door is ajar for a minimum threshold period of time, e.g., 2 minutes. The monitoring and control system in such a situation may broadcast to all target users' mobile apps a notification, using push notification service 440.

Notify the adult users of the designated area: this selected action to be taken is the same as described herein for notifying the owner of the designated area (e.g., home owner) with the notifications delivered to all adult users of the house ("target users").

Notify all users of the designated area: this selected action is the same as described herein for notifying the owner of the designated area, with the notifications delivered to all users of the designated area ("target users").

Send an alert to the trusted group: the corresponding sensed event is at a high enough priority that it warrants notifying a trusted group of individuals that the owner of the designated area has previously identified ("target users").

Note that the target users may not necessarily be users of the monitoring and control system, according to an embodiment. For example, one embodiment can bring a mobile app to the foreground with an alert message, potentially ringing as a telephony app. For all contact numbers not associated with an active mobile app device, or for apps that do not confirm that the app transitioned to the foreground, one embodiment may initiate a call to the target user's contact numbers.

Send an alert to the wider social neighborhood: the corresponding sensed event is significant enough to warrant also notifying a wider social group, either through the neighborhood-based software application or other third party services. Broadcast on all social groups connected to the designated area an alert based on the sensed event. No response is required.

Raise an alarm: this action to be taken is a critical response to an active threat situation, e.g., fire or intruder in the designated area, or area therein or portion thereof. Depending on the level of service, the following may be relevant:
  if central station monitoring is subscribed, then send a threat message to the appropriate central station;
  if the confidence level of the occupancy state is at the lowest level (e.g., homeowner input to UI that s/he is on vacation), then raise an alarm to a delegated trusted group, if any;
  raise an alarm to the designated area (home) owner;

if the home owner does not respond to the alarm, raise an alarm to all other adult users of the designated area; and sound the siren installed in the designated area.

Raising an alarm involves taking active steps to ensure that the target users are contacted, including causing a mobile app come to the foreground with an alert message, potentially ringing as a telephony app, and for all contact numbers not associated with an active mobile app device, or for apps mentioned above that did not confirm that the app transitioned to the foreground, an embodiment initiates a call to the target user's contact numbers.

Transmit a message to an authorized user that has entered, or exited, a designated area: when a user is detected entering or present in a designated area, a message may be sent to the user, for example, at the request of another use, or initiated by the monitoring and control system. Likewise, when a user is detected leaving or way from a designated area, a message may be sent to the user, for example, at the request of another use, or initiated by the monitoring and control system.

Figure 1D:
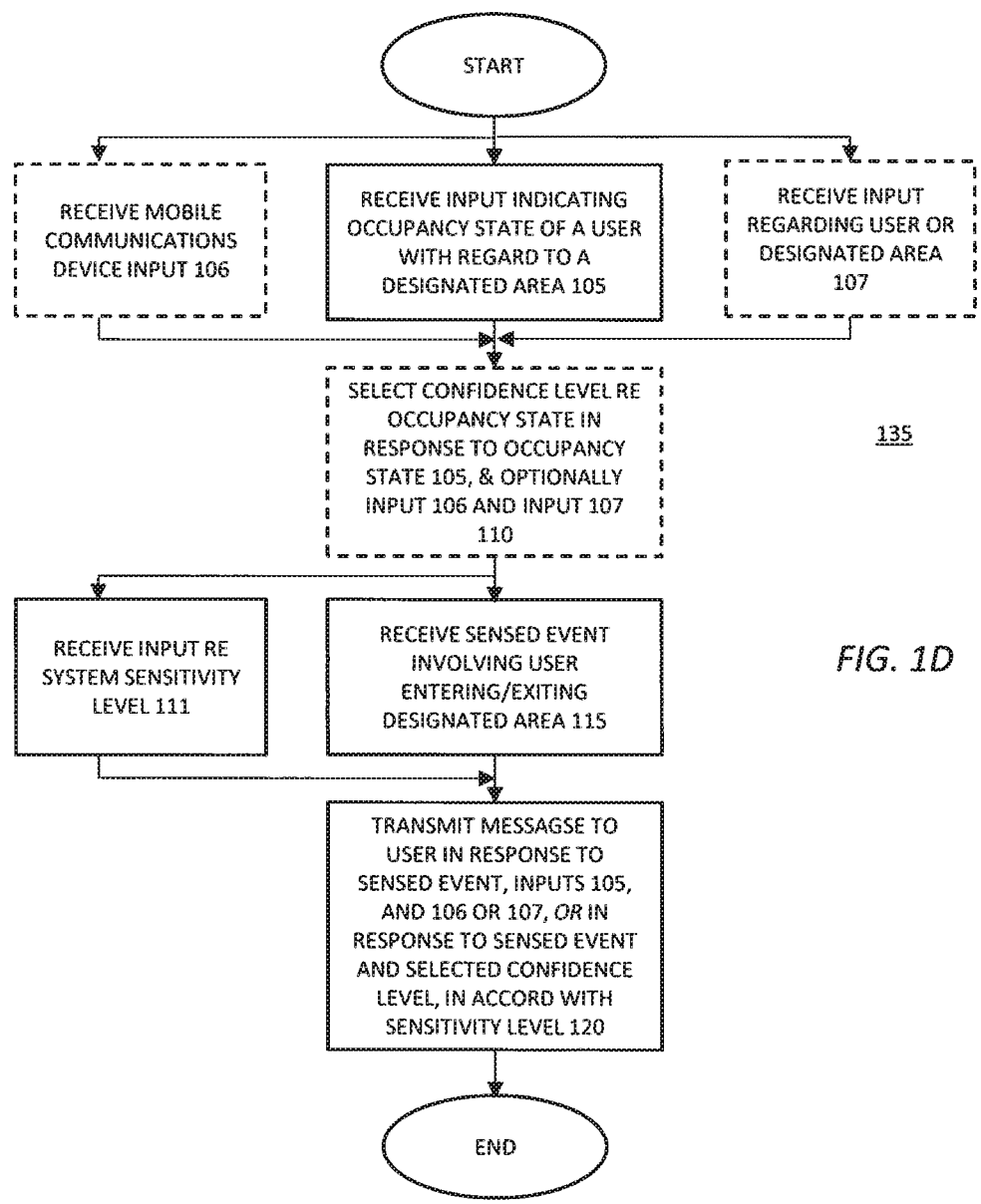
FIG. 1D is a flowchart of an embodiment of the invention.

It is appreciated, as shown in the flow diagram of FIG. 1D, that the embodiments illustrated FIGS. 1A-1C can be optionally combined in any manner. FIG. 1D further demonstrates an additional embodiment, in which the monitoring and control system receives input regarding a sensitivity level for the monitoring and control system at 111. Thus, the embodiment proceeds as generally described above: the monitoring and control system receives input at 105 indicating the occupancy state of, or for, a user with regard to a designated area, the monitoring and control system then optionally selects one of the confidence levels regarding occupancy state of the user with regard to the designated area based on input received at 105, optionally further based on the received geofencing or geolocation information transmitted from one or more mobile communication devices 465 within or around the user and/or designated area at 106, and optionally further based on the received additional input about information relevant to or about the user or designated area at 107. Based on one or more of these inputs, the monitoring and control system optionally selects, at 110, the confidence level. The monitoring and control system receives at 115 one or more notifications of a sensed event from one or more sensors 410 or mobile devices 465 situated within or around the designated area, such as a user present in or away from the designated area, or the user entering or exiting the designated area. In this embodiment, some time prior to selecting the action to be taken responsive to the sensed event and, optionally, the selected confidence level, the monitoring and control system receives input regarding the sensitivity level for the monitoring and control system at 111. Then the system selects the action to be taken at 120 further responsive to the received sensitivity level for the monitoring and control system. In one embodiment, the monitoring and control system receiving input regarding the sensitivity level for the monitoring and control system comprises receiving machine-learned input and/or user input, for example, user input via the user interfaces described above, regarding the sensitivity level for the monitoring and control system.

It is appreciated that home owners will differ in the level of control or action, e.g., communications or protection that they wish to receive from the system and in the aggressiveness of the controls, interactions and actions provided in response to sensed events. The sensitivity level of the monitoring and control system may either be explicitly set by or solicited from a user, in one embodiment. The monitoring and control system sensitivity levels vary from low to high, and may be enumerated, such as: low, moderate, and high.

Figure 1E:
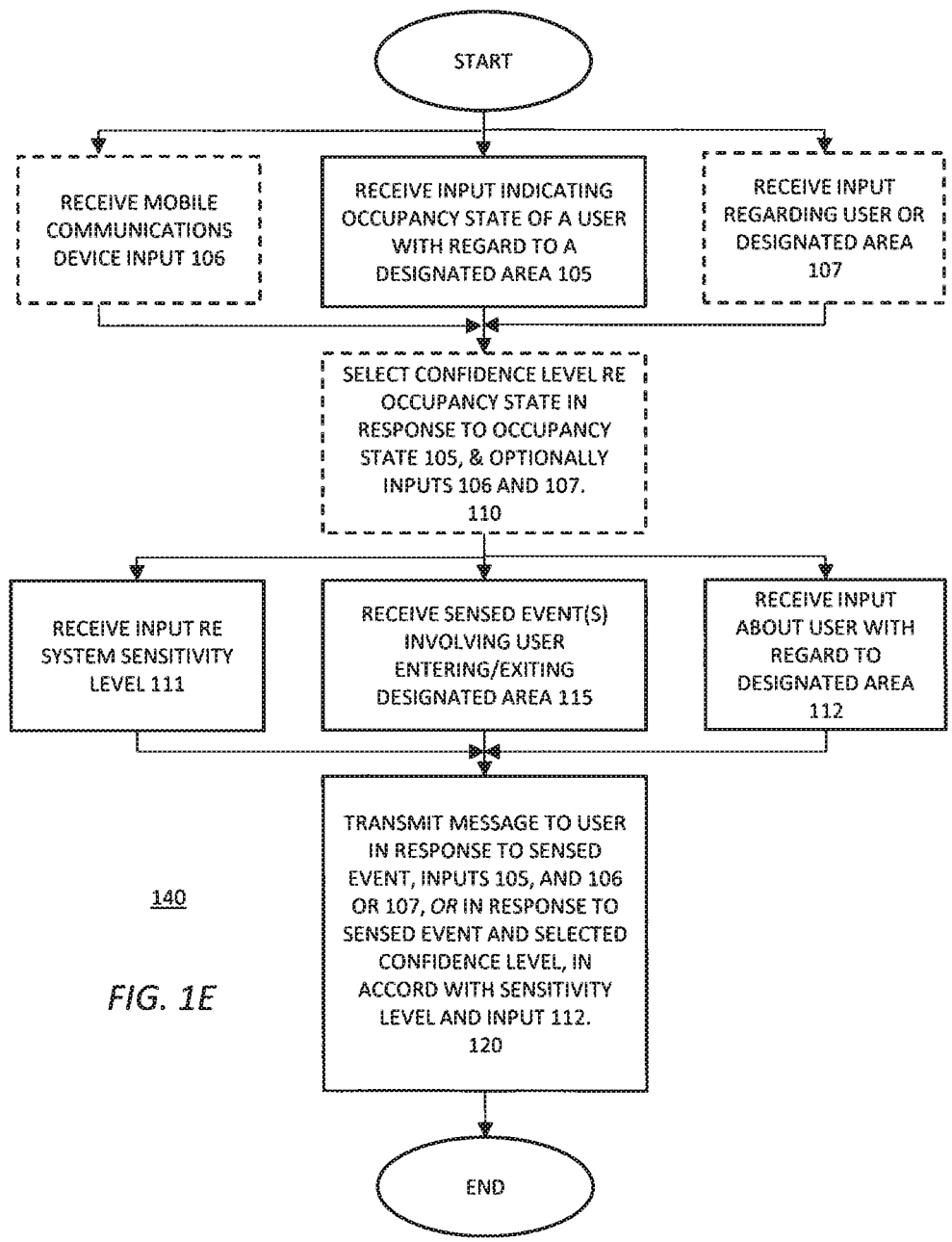
FIG. 1E is a flowchart of an embodiment of the invention.

With reference to FIG. 1E, one embodiment of the invention receives additional input at 112 relevant to or about a user and/or the designated area, or one or more areas therein or portions thereof, for example, user input selecting a particular one or more rooms, or areas, or portions of the designated area, or temperature sensor(s) therein so that the embodiment uses the temperature sensor(s) therein as the input for measuring temperature for a temperature control system or one or more thermostats for the designated area; learned occupancy schedule of a user (work/school/other of various occupants, e.g., building service personnel on-site patterns); pattern of where and/or when mobile communication devices associated with the user are present (based on such devices being on the person of an occupant within the designated area), in or absent from, the designated area; time of day; day of week; seasonal-, holiday-, or personal observances of various occupants; current weather conditions; adverse and/or extreme weather conditions. In this regard, this step is similar to step 107 in which similar information is gathered either via user input, via sensors 410, or via mobile communication devices 465. However, in this embodiment, this information, rather than being used by the monitoring and control system to select one of the confidence levels regarding occupancy state of the designated area, is being used by the monitoring and control system to select the action to be taken further responsive to the received additional input. It is appreciated that this information being used in steps 107 and 112 need only be stored once, and the information can then be used by one or both steps. The information can be stored in a database 450, accessed and read into a local data store in memory 425 and used by the monitoring and control system software application 420 to perform steps 110 and/or 120.

The additional input about information relevant to or about a user and/or the designated area received at 107 or 112 can be thought of as learned behavior qualifiers to the input received at 105, for example, from sensors 410. This information may be considered and provided as a weighting to the sensed events as discussed herein. Specifically, in one embodiment, the weighting that is applied to the sensed event is a level of confidence that the sensed event is expected, anticipated or otherwise behavior that has been learned by the system to be considered normal ("Learned Behavior Confidence", or "LBC"). The learned behavior confidence, in one embodiment, is a value that ranges from 0 to 100, where 0 represents no confidence that the sensed event is expected, anticipated or otherwise normal, up to where 100 represents that the sensed event is completely expected, anticipated or otherwise normal.

An embodiment of the invention can consider the learned behavior confidence when selecting the action to be taken at 120, and elevate or reduce the intensity of the action to be taken.

The following description enumerates learned behavior qualifiers and how each may impact the value of the learned behavior confidence weighting:

Time of day: if the sensed event occurs and during the last time period (e.g., 30 days—adjustable time period) there was a similar sensed event (same target and target area) during the same time window (half hour before and after—adjustable window) then the LBC is weighted with the number of days this occurred out of the time period.

Learned schedule (work/school/other): pattern of when mobile communication devices are present or absent from the designated area/day of week and/or learned pattern of occupancy establishment. If the indicated sensed event occurs while the confidence level regarding the occupancy state is currently at its lowest confidence or low confidence level, and during the last time period (30 days—adjustable time period) there were: one or more mobile communication devices present on at least three of the preceding same day of the week, or confidence level regarding the occupancy state for the designated area was at the highest level on at least three of the preceding same days of the week, then the LBC is set to the percentage with the number of days that the behavior was present on this specific day of the week in the last preceding 6-month time window.

Service personnel patterns: this is handled in a manner similar to the above described learned schedule.

Seasonal observances and/or holidays—discount the learned schedule. In one embodiment, these items cause the learned schedule to not be applied, or may reduce the weighting by it a certain percentage.

Adverse current weather conditions, e.g., extreme temperature: if the occupancy state occurs while the confidence level of the occupancy state is currently at the lowest confidence level or low confidence level, and the current weather conditions are currently abnormal (tornado, blizzard, etc.) or the temperate can be considered extreme for the area (either cold or hot extremes), then set LBC to 50 percent on the assumption that individuals may be in the designated area (e.g., a house) that otherwise would be outside or working.

Figure 1F:
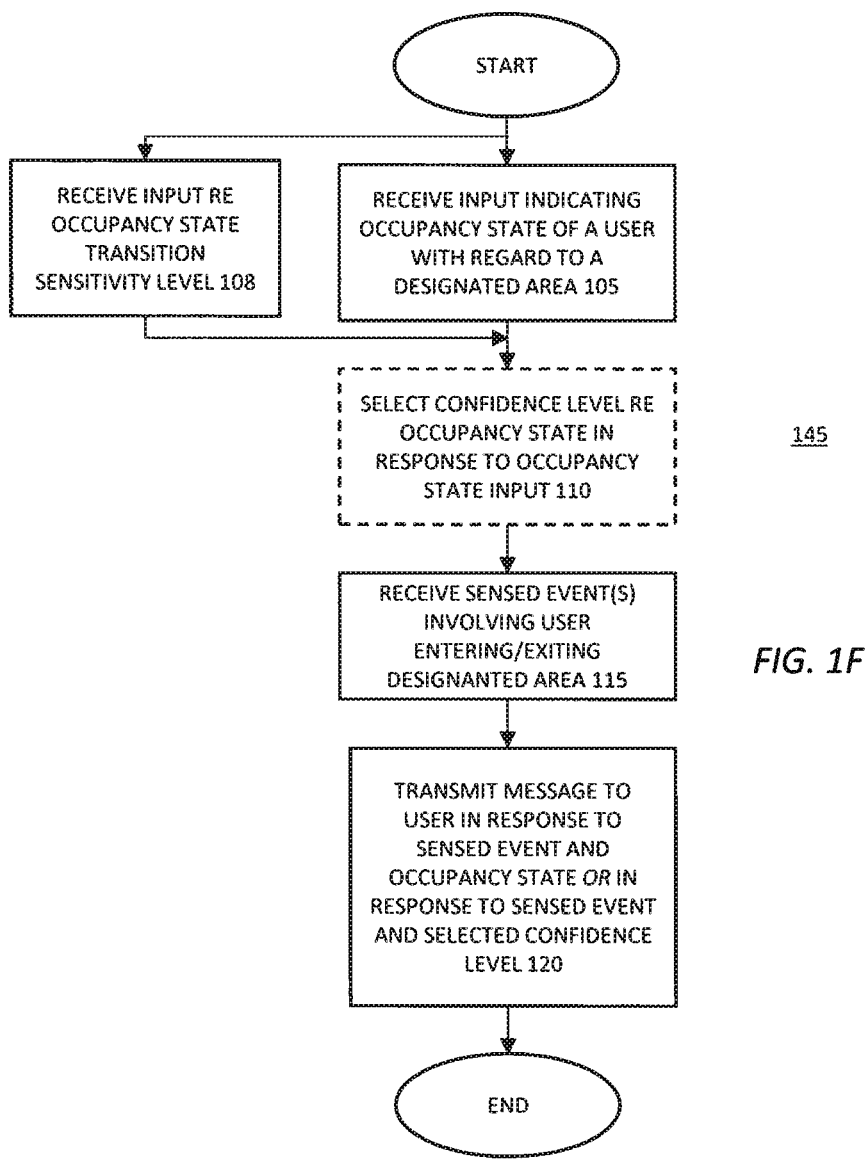
FIG. 1F is a flowchart of an embodiment of the invention.

With regard to FIG. 1F, one embodiment of the invention receives input selecting an occupancy state transition sensitivity level at 108. The monitoring and control system then optionally selects the confidence level regarding occupancy state of the designated area further in response to the selected occupancy state transition sensitivity level. In one embodiment, the occupancy state transition sensitivity level may be selected as one of the following: a lowest sensitivity level, a low sensitivity level, a moderate sensitivity level, a high sensitivity level, and a highest sensitivity level. Thus, this embodiment may proceed as generally described above, but further including the step of the monitoring and control system selecting one of the confidence levels regarding occupancy state of a user with regard to the designated area based on the selected occupancy state transition sensitivity level, in addition to input received at 105 indicating the occupancy state for a user with regard to the designated area, optionally further based on the received geofencing or geolocation information transmitted from one or more mobile communication devices 465 within or around the user and/or the designated area at 106, and optionally further based on the received additional input about information relevant to or about the user and/or designated area at 107.

In this embodiment, selecting the confidence level regarding occupancy state of the user with regard to the designated area further based on the selected occupancy state transition sensitivity level affects the time at which the monitoring and control system switches to the selected confidence level. To that end, each occupancy state transition sensitivity level is associated with a schedule or period of time to delay or wait before transitioning to the selected confidence level regarding occupancy state of the designated area. In this embodiment, the monitoring and control system optionally receives input regarding learned behaviors of individuals that have occupied the designated area, and adjusts the associated schedule for transitioning to the selected confidence level regarding occupancy state of a user with regard to the designated area, based thereon. In such an embodiment, the confidence level is selected according to the adjusted associated schedule for transitioning to the selected confidence level regarding occupancy state of the designated area.

Ideally, the monitoring and control system transitions between confidence levels of occupancy states with perfect and complete information and immediately following an occupant's actions or other relevant system input, sensor or otherwise. In practice, according to one embodiment, the monitoring and control system may delay transitioning to a new occupancy state confidence level for a period of time in order to gain confidence regarding an occupant's actions, with an appreciation that reducing the time required to transition from one occupancy state confidence level to another occupancy state confidence level is beneficial. In this embodiment, the sensitivity level of the monitoring and control system with respect to occupancy state confidence level transitions is first set through an occupancy state transition sensitivity level which is either explicitly set by or solicited from a user. The occupancy state transition sensitivity levels vary from lowest to highest, as enumerated above. The selected occupancy state transition sensitivity levels map to a timeout which this embodiment uses before transitioning to another occupancy state confidence level. Each specific use of the occupancy state transition sensitivity level has its own unique set of timeouts, tailored to the specific transition, and are defined as set forth below.

In one embodiment, following an initial timeout value, there can be one or more optional learned behaviors that the monitoring and control system can calculate and use to reduce the timeout. Like the initial occupancy state transition sensitivity level, these learned behaviors reduce the timeout in a specific way for each unique use.

Occupancy State Transition Sensitivity Level for No Motion Detection after Exit

After a potential exit of an individual from the designated area has been detected, the embodiment waits for a certain period of time before transitioning from the highest confidence level of occupancy state. Table 1, below, suggests the time period to wait parameter, according to an embodiment.

TABLE 1

| Occupancy state transition sensitivity level for no motion detection after exit | |
|---|---|
| Occupancy state transition sensitivity level | Time to wait after exit detected |
| Lowest | 8 hours |
| Low | 4 hours |
| Moderate | 1 hour |
| High | 30 minutes |
| Highest | 15 minutes |

The following learned behaviors can be calculated and reduce the time to wait value. A histogram of previous activity strongly suggests that all owners or managers of the designated area (e.g., home owners) are away during this time window. For example, over the past recent time period (e.g., 30-day history, current day of the week, 60-day history, or bi-weekly current day of week), the designated has been unoccupied during this same time window (plus or minus 15 minutes from the current time). In this situation, if the value of the time to wait parameter is:

greater than a first minimum threshold of time (e.g., 95%), then set the value of the time to wait parameter to the highest value; or greater than a second minimum threshold of the time (e.g., 80%) which is less than the first minimum threshold of time, then reduce the time to wait parameter to half of the current value.

The following learned behaviors can be calculated to increase or otherwise adjust the value of the time to wait parameter. A histogram of previous activity strongly suggests that the designated area is occupied or likely occupied only by one or more unidentified occupants (for example, people not positively tracked by identified user tracking as described elsewhere herein). For example, over the past recent time period (e.g., 30-day history, current day of the week, 60-day history, or bi-weekly current day of week), an exit event was detected during this same time window (plus or minus 15 minutes from the current time) and the designated area subsequently had an internal motion detection event (a "triggering motion event") that caused a transition from a confidence level of occupancy state of low confidence, high confidence, or highest confidence to the highest confidence level of occupancy state. In this situation, if the value of the time to wait parameter is:

greater than a first minimum threshold of the time (e.g., 95%) then set the value of the time to wait parameter to an interval of time between now and the average triggering motion event; or greater than a second minimum threshold of time, which is less than the first minimum threshold of time (e.g., 70%), then increase the value of the time to wait parameter to an interval of time between now and the average triggering motion event.

Occupancy State Transition Sensitivity Level for No Motion for Extended Period

After a long period of inactivity in the designated area, the monitoring and control system, according to one embodiment, may begin to build a level of confidence that all occupants have left and the designated area is now empty. Table 2 below sets out the time period to wait.

TABLE 2

| Occupancy Sensitivity Level for No Motion for Extended Period | |
|---|---|
| Occupancy state transition sensitivity level | Time to wait for no motion detection |
| Lowest | 24 hours |
| Low | 20 hours |
| Moderate | 18 hour |
| High | 16 hours |
| Highest | 14 hours |

The following learned behaviors can be calculated and reduce the value of the time to wait parameter. A histogram of previous activity strongly suggests that the owner(s) of the designated area (e.g., home owners) are away during this time window. For example, over the past recent time-period (e.g., 30-day history, current day of the week, 60-day history, bi-weekly current day of week), the designated area has become unoccupied during this same time window (plus or minus 15 minutes from the current time). In this situation, if the value of the time to wait parameter is greater than a first minimum threshold of time (e.g., 95% of the time), then set the value of the time to wait to the highest value, or greater than a second minimum threshold of time (e.g., 80% of the time), then reduce the value of the time to wait parameter to half of the current value.

If minors are present in the designated area, set the value of the time to wait parameter to at least the value associated with the high occupancy state transition sensitivity level. If the last motion detection ended in a particular area, such as a bedroom area, and no motion was detected in the adjoining exit way, then a longer period of waiting is appropriate, in which case set the value of the time to wait parameter to the value associated with the low occupancy state transition sensitivity level.

Figure 1G:
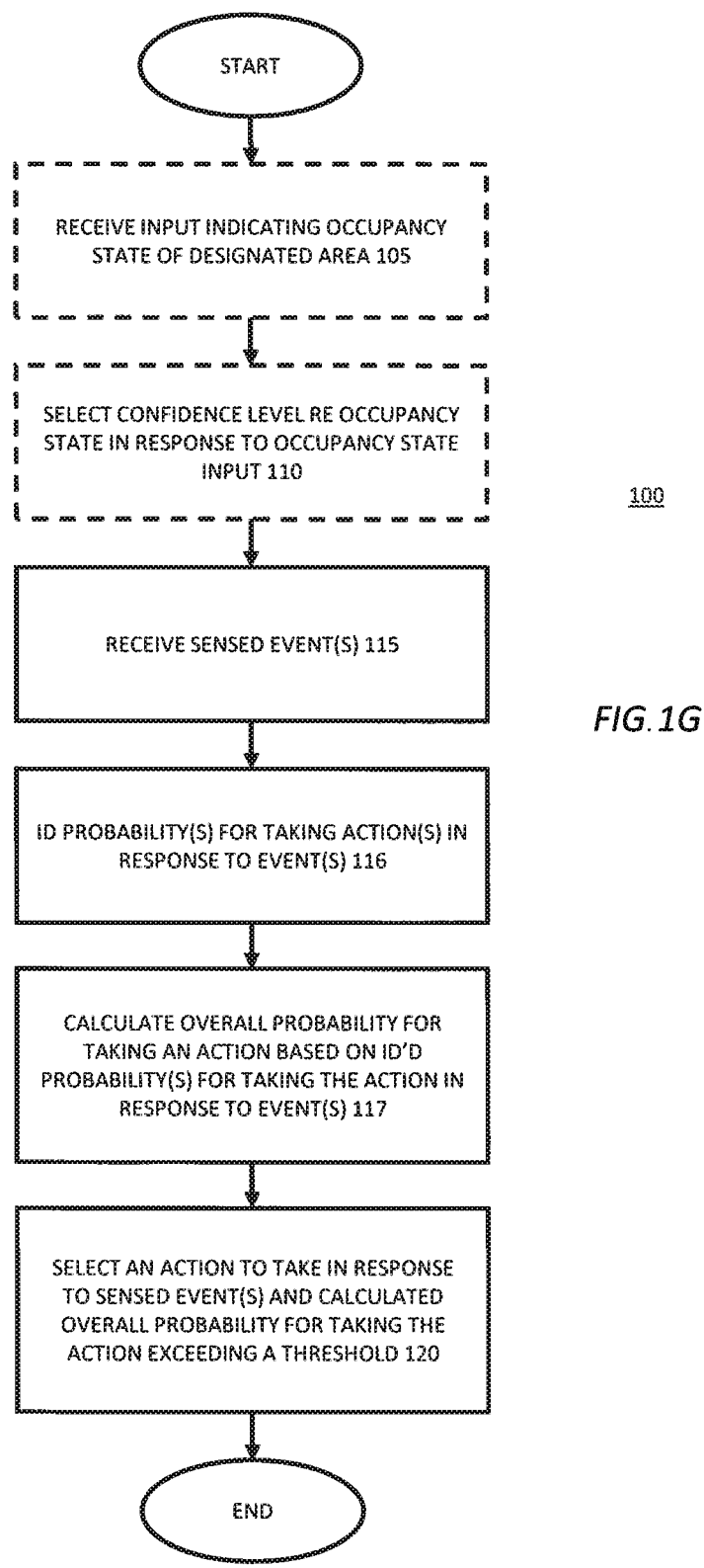
FIG. 1G is a flowchart of an embodiment of the invention.

With reference to FIGS. 1G and 4, embodiments of the invention 100, 400 cause a monitoring and control system to optionally receive input at 105 indicating the occupancy state of, or for, a designated area, such as a house, one or more rooms or areas in the house, a building, one or more rooms or areas in the building, a gated community, a group of buildings, a campus, a public or private venue, a geofenced area defining any portion or combination thereof, and any portions or combinations thereof. This input helps inform the monitoring and control system of the likelihood that there are occupants in the designated area, or in one or more of a plurality of areas therein or portions thereof. Based on this input, the monitoring and control system may, optionally, select, at 110, a confidence level of the occupancy state for the designated area, or one or more of a plurality of areas therein or portions thereof (boxes 105 and 110 in the flowchart of FIG. 1G are shown in a dashed line to indicate optional steps in embodiments of the invention). In one embodiment, the confidence level is selected from one of a number of confidence levels regarding occupancy state of the designated area, or regarding one or more of a plurality of areas therein or portions thereof.

With reference to the example 700 depicted in FIG. 7, the monitoring and control system next receives input at block 115 in the form of one or more sensed events, such as described above with reference to FIGS. 1A-1F, e.g., events E1, E2 and E3. To illustrate by way of example, assume E1=detection of a glass break event at a particular location, say, a master bedroom window, occurring at a particular time, say, late at night, e.g., 12:05 AM; E2=detection of a motion event at a nearby location, say, within the master bedroom, occurring at a particular time immediately thereafter, say, 12:06 AM; and E3=detection by a microphone or noise sensor of a quick succession of loud noise events, say, shots fired, in the same location, i.e., within the master bedroom, occurring at a particular time shortly thereafter, say, 12:10 AM.

Logic, according to embodiments of the invention, e.g., logic being executed by system software application 420, can select one or more of a plurality of actions to take in response to one or more events taking place over a period of time. In the above, straightforward, example, it certainly appears that an intruder has broken and entered a home and fired a weapon successive times presumably at an occupant (indeed, there may be another one or more events previously detected (earlier in the evening or concurrent with the events described in this example) that suggest with a high confidence level that the master bedroom is occupied).

According to one embodiment, the logic identifies at block 116, for each event (e.g., events E1, E2, E3) taken independently, that is, by itself and without regard to detection of other events possibly related based on time or location of occurrence, if any, a probability, P, for taking each of one or more possible actions in response to the event. For example, for event E1 (glass break detection), assume some number, n, of possible actions (A) may be taken, the first possible action (A1) being turning on an alarm of some type at some location, e.g., a sound alarm on the premises in response to glass break detection, the second possible action (A2) being sending a communication to the home owner, e.g., sending a text message to the home owner's mobile device notifying date, time and location of glass break detection, and the nth possible action (An) being sending a communication to the police or 911 services, e.g., initiating a silent alarm to police services. In this example, there might be a high probability (P_A1) assigned to taking action A1, such as sounding an alarm on premises, and likewise a high probability (P_A2) assigned to taking action A2, such as sending a communication to the homeowner, but less probability (P_An) assigned of taking action An, such as calling police or 911 services, since it's not entirely clear that an emergency of such significance has occurred that police services should be called.

However, according to embodiments of the invention, the probability identified or assigned to taking any particular action in the occurrence of an event may differ, dynamically, and in real time, based on many factors, such as the type of event, the sequence and timing of the occurrence of the event in relation to the occurrence of other events (i.e., the age of an event relative to other events, a weight assigned (and that may change or decay over time) to the event based on the event's absolute age or age relative to a weight assigned to other events based on their age), the location of the event in relation to the location of other events, the expiration of an event (as the event ends or as it is dropped due to its age), the type of action, and external factors as well, such as learned occupancy schedule, pattern of where and/or when mobile communication devices are present in, or absent from, the designated area, time of day, day of week, seasonal-, holiday-, or personal-observances or patterns of various occupants, current weather conditions, and adverse and/or extreme weather conditions. Information about events, including patterns regarding timing, location, and frequency of occurrence, and information about external factors, and the extent to which they influence events based on the age of the external factors, may all be maintained in a database, e.g., database 450, accessible to the system software application 420. This information may be gathered over time, and used as input to a machine learning algorithm that calculates and identifies or assign a probability for taking an action in response to an event using the gathered information.

Continuing with the example, for event E2 (motion detection), assume the same possible actions may be taken, the first possible action (A1) being turning on an alarm of some type at some location, e.g., a sound alarm on the premises in response to motion detection, the second possible action (A2) being sending a communication to the home owner, e.g., sending a text message to the home owner's mobile device notifying date, time and location of motion detection, and the nth possible action (An) being sending a communication to the police or 911 services, e.g., initiating a silent alarm to police services, in response to motion detection. In this example, there might be a moderate or low probability (P_A1) of taking action A1, sounding an alarm on premises, based on event E2 by itself (since, for example, a home owner may often times arise during the night to relieve him or herself), and likewise a moderate or low probability (P_A2) of taking action A2, sending a communication to the homeowner, and perhaps less probability (P_An) of taking action An, calling police or 911 services, since it's not likely an emergency of such significance has occurred that police services should be called based on the occurrence of event E2 by itself. Note, too that, while this example contemplates identifying the same three possible actions (A1, A2 and An) upon the occurrence of events E1 and E2, it is appreciated that there may be less or no overlap between the possible actions to be taken upon the occurrence of one event versus another event. For example, a first event (E1) may have associated with it or be responded to with possible actions A1, A2, A4, and A6, whatever those actions are, whereas a second event (E2) may have associated with it possible actions A1, A3, A4 and A5.

Continuing further with the example, for event E3 (noise detection), again assume the same possible actions may be taken, the first possible action (A1) being turning on an alarm of some type at some location, e.g., a sound alarm on the premises in response to the noise detection, the second possible action (A2) being sending a communication to the home owner, e.g., sending a text message to the home owner's mobile device notifying date, time and location of noise detection, and the nth possible action (An) being sending a communication to the police or 911 services, e.g., initiating a silent alarm to police services, in response to the noise detection. In this example, there might be a high probability (P_A1) of taking action A1, sounding an alarm on premises, based on event E3 by itself, and likewise a high probability (P_A2) of taking action A2, sending a communication to the homeowner, and perhaps too a high probability (P_An) of taking action An, calling police or 911 services.

At block 117, logic then calculates, for each of the possible actions, e.g., for each of possible actions A1—turning on an alarm of some type at some location, A2—sending a communication to the home owner, and An—sending a communication to the police or 911 services, an overall probability (OP_A1, OP_A2, and OP_An) for taking the action based on the identified probabilities for taking the action in response to the events. Thus, according to the example, logic at block 117 calculates an overall probability (OP_A1) for taking the first action A1, based on the identified probability (P_A1) of taking the first action A1 in response to event E1, the identified probability (P_A1) of taking the first action A1 in response to event E2, and the identified probability (P_A1) of taking the first action A1 in response to event E3. Likewise, logic at block 117 calculates an overall probability (OP_A2) for taking the second action A2, based on the identified probability (P_A2) of taking the second action A2 in response to event E1, the identified probability (P_A2) of taking the second action A2 in response to event E2, and the identified probability (P_A2) of taking the second action A2 in response to event E3. Finally, logic at block 117 calculates an overall probability (OP_An) for taking the nth action An, based on the identified probability (P_An) of taking the nth action An in response to event E1, the identified probability (P_An) of taking the nth action An in response to event E2, and the identified probability (P_An) of taking the nth action An in response to event E3.

There are any number of ways to calculate the overall probability OP for taking an action based on the identified probabilities for taking the action in response to one or more separate events. According to one embodiment, the calculation may be accomplished using the following equation:

$$P\_An = 1 - (1 - E1:P\_An) * (1 - E2:P\_An) * (1 - E3:P\_An)$$

where n=a number associated with a particular action, such as n=1 to indicate a first possible action to be taken, n=2 to indicate a second possible action, etc. With this equation, the more events involved, even if the probability for taking a particular action in the case of each event is modest or low, the probability increases to a value that can more likely exceed the threshold beyond which the possible action will indeed be taken.

At block 120, logic then selects one or more of the possible actions (A1, A2 and An, in our example) to be taken in response to the events (E1, E2 and E3, in our example) and based on the calculated overall probability for taking the action, for each of the one or more possible actions, exceeding a respective threshold. Thus, in this example, logic selects action A1 in response to events E1, E2 and E3, based on the calculated overall probability OP_A1 for taking action A1 exceeding a respective threshold T_OP_A1 (118), selects action A2 in response to events E1, E2 and E3, based on the calculated overall probability OP_A2 for taking action A2 exceeding a respective threshold T_OP_A2 (118), and selects action A3 in response to events E1, E2 and E2, based on the calculated overall probability OP_A3 for taking action A3 exceeding a respective threshold T_OP_A3 (118). It is contemplated in the embodiments that, depending on the various threshold probability values set for taking each action, and the calculated overall probability for taking each action, zero or more actions to be taken may actually be selected in a given set of circumstance.

In one embodiment, comparison of the threshold against the calculated overall probability for taking the action, for each of the one or more possible actions, is performed instantaneously. In another embodiment, the threshold must be exceeded for a period of time before the selected action is taken. In one embodiment, the threshold is static, but in other embodiments, the threshold is dynamic, and the dynamic threshold must be exceeded for the entire duration of the period of time before the selected action is taken.

Just like the probability identified or assigned to taking any particular action in the occurrence of an event may differ, dynamically, and in real time, based on many factors, as described above, likewise, the threshold values against which the calculated overall probabilities for taking action are compared, may be set to a value, dynamically, and in real time, based on many factors, such as the type of an event, the sequence and timing of the occurrence of the event in relation to the occurrence of other events, the location of the event in relation to the location of other events, the type of action, and external factors as well, such as learned occupancy schedule, pattern of where and/or when mobile communication devices are present in, or absent from, the designated area, time of day, day of week, seasonal-, holiday-, or personal-observances or patterns of various occupants, current weather conditions, and adverse and/or extreme weather conditions. Information about thresholds, and information about external factors that influence thresholds, may all be maintained in a database, e.g., database 450, accessible to the system software application 420. This information may be gathered over time, and used as input to a machine learning algorithm that assigns a threshold for a probability for taking an action in response to one or more events, using the gathered information.

Figure 1H:
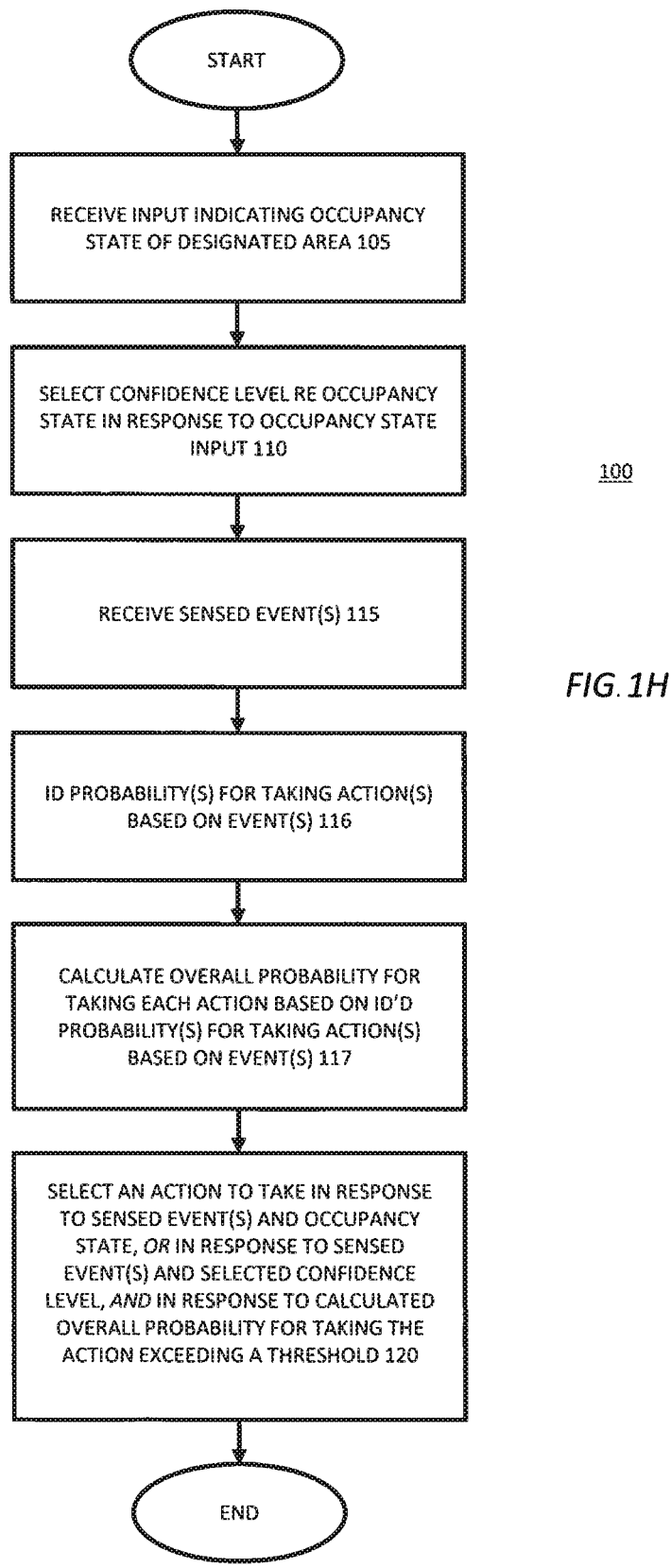
FIG. 1H is a flowchart of an embodiment of the invention.

The embodiment described above with respect to FIGS. 1G, 4 and 7, can be modified according to other the embodiments described herein above with respect to FIGS. 1A-1F. For example, with reference to FIG. 1H, the embodiment illustrated therein is modified relative to the embodiment described above with respect to FIGS. 1G, 4 and 7. In particular, with reference to FIGS. 1H and 4, embodiments of the invention 100, 400 cause a monitoring and control system to receive input at block 105 indicating the occupancy state of, or for, a designated area, such as a house, one or more rooms or areas in the house, a building, one or more rooms or areas in the building, a gated community, a group of buildings, a campus, a public or private venue, a geo-fenced area defining any portion or combination thereof, and any portions or combinations thereof. This input helps inform the monitoring and control system of the likelihood that there are occupants in the designated area, or in one or more of a plurality of areas therein or portions thereof. Based on this input, the monitoring and control system then selects, at block 110, a confidence level of the occupancy state for the designated area, or one or more of a plurality of areas therein or portions thereof (boxes 105 and 110 in the flowchart of FIG. 1H are shown in a solid line to indicate non-optional, or required, steps in embodiments of the invention). In one embodiment, the confidence level is selected from one of a number of confidence levels regarding occupancy state of the designated area, or regarding one or more of a plurality of areas therein or portions thereof.

Logic at blocks 115, 116 and 117 of FIG. 1H operate according to the embodiment described above with respect to FIG. 1G and so will not be repeated here. However, the monitoring and control system selects at block 120 in FIG. 1H an action to be taken based on one or more of the sensed events, the occupancy state obtained at block 105 or the selected confidence level obtained at block 110, and in response to the calculated overall probability for raking the action exceeding a threshold 118 as described above with respect to this component of block 120 in FIG. 1G.

Likewise, the embodiments described above in connection with FIGS. 1G, 1H, 4 and 7 may likewise be modified according to any one of the embodiments described above in connection with FIGS. 1B-1F. For example, to take advantage of the features available in the embodiment described with respect to FIG. 1B, the embodiments described above in connection with FIGS. 1G, 1H, 4 and 7 may be modified to receive input from mobile communications device at block 106, and the action selected at block 120 takes in to account that input accordingly. As another example, to take advantage of the features available in the embodiment described with respect to FIG. 1C, the embodiments described above in connection with FIGS. 1G, 1H, 4 and 7 may be modified to receive input regarding a designated area at block 107, and the action selected at block 120 takes in to account that input accordingly. Similarly, to take advantage of the features available in the embodiment described with respect to FIG. 1D, the embodiments described above in connection with FIGS. 1G, 1H, 4 and 7 may be modified to receive system sensitivity level input at block 111, and the action selected at block 120 takes in to account that input accordingly. To take advantage of the features available in the embodiment described with respect to FIG. 1E, the embodiments described above in connection with FIGS. 1G, 1H, 4 and 7 may be modified to receive system sensitivity level input at block 111, and receive input regarding a designated area at block 112, and the action selected at block 120 takes in to account such input accordingly. Finally, the features of the embodiment described with respect to FIG. 1E may be incorporated into the embodiments described above in connection with FIGS. 1G, 1H, 4 and 7 to receive input regarding occupancy state transition sensitivity level at block 108, and the action selected at block 120 takes in to account that input accordingly.

As described herein, embodiments of the invention provide for monitoring of individuals, and in particular, transmitting messages, such as personalized home productivity messages, to an individual, for example, when the individual enters or exits a designated area, or one or more of a plurality of areas therein or portions thereof. To that end, embodiments of the invention may have a console, display panel, monitor, or other display device or user interface 430 located at typical, main, or major, exterior doors, or ingress/egress points for the one or more areas therein or portions thereof. Any one of these devices may include or be combined with components such as a display, touchpad, speaker, microphone, proximity sensor, camera, and connectivity and communications (wireless or wired) to couple the device to the system 400. Such a device may use facial or gesture recognition to identify individuals which are in range of the device, and if the device detects a known occupant or authenticated user, the device can present to, or receive information from, the known occupant/authenticated user. The information presented, whether in audible and visual form, or both, is dynamic and can be tailored by the system 400 for that particular individual. For example, one occupant, a mother, may tell the system, either by way of input at this device or through a mobile communication device 465 (for example, a smart phone) which is in communication with the system, to transmit a message to another occupant, e.g., her son, to perform some task, e.g., unload the dishwasher, at some point in time after entering the designated area, e.g., upon the son coming home from school. In this example, when the son walks through an entry point to the designated area, e.g., walks through the front door of a house, the system recognizes him through facial detection or via smart device geolocation and proximity. The system displays a visual notification on the display screen of the device, and/or may provide an audible announcement, regarding the message received from the mom. The system can receive further input via the device or the son's mobile communication device confirming receipt of the message.

A messaging service according to this embodiment may also provide status of a location of (i.e., location information for) a resident/occupant to other occupants or participants in the system, via a display device such as user interface 430, or via an application executing on a mobile communications device 465. The service can provide detailed information regarding when someone is in the designated area, or one or more of a plurality of areas therein or portions thereof, and when someone is away from the designated area, or one or more of a plurality of areas therein or portions thereof, as well as a history of when someone was located in or outside a designated area over a given period of time. If known, the service can provide information as to the current (exact) location of an occupant, and if someone is away from a designated area, when he or she is expected to return (as discerned through mobile device geolocation or scheduling interpretation).

The user interface device 430, or the like, located at one or more main external doors or ingress/egress points for a designated area, along with a display screen, camera and speaker, with facial recognition capability, provides for individually targeted messages upon someone entering or exiting a designated area, e.g., a building. According to embodiments, individuals can sent messages about upcoming tasks, events, schedules, and reminders. such tasks, events, schedules, and reminders can be geolocation-specific and combined with other inputs, such as occupancy state information received at 105, selected confidence levels regarding occupancy state at 110, sensed events at 115, mobile communications device input at 106, input received regarding a designated area at 107 and at 112, input received regarding system sensitivity level at 111, and input received regarding occupancy state transition security level at 108, all of which as described above with reference to FIGS. 1A-1F. For example, embodiments of the invention can review a long-term weather forecast indicating upcoming freezing temperatures, initiate a reminder to have your exterior water pipes emptied of standing water before a freeze occurs. And even contact the service provider through email or other messaging service to schedule a service call.

Embodiments of the invention as described above also provide for aging in place for elderly residents, or similarly, attending to young persons in place. Embodiments of the invention, over time, collect baseline statistics of the movement patterns of residents/occupants, and then can detect and issue one or alerts regarding deviations from the baseline. For example, embodiments can track when a specific resident/occupant usually arrives in a designated area, or one or more of a plurality of areas therein or portions thereof, for example, in the morning, the movement patterns of the resident/occupant during the day (from room to room, leaving and returning to the designated area during the day, etc.), and the time the resident/occupant leaves the designated area, or goes to bed. Likewise, activity during the night can be monitored, such as when a resident is getting up regularly during the night, and whether the resident sleeps soundly or rolls around in bed. Motion sensors both in the bed itself, and in the bedroom in general, allow the system to detect quality of sleep in bed or someone pacing around the room during the night. Once captured and stored in database 450, these baseline patterns can be shared with the resident/occupant, family members, or even the resident's medical practitioners or therapists. This information may be used by such practitioners as indicative of changes in health, onset of dementia, or complications associated with medications, as examples. The lack of movement during a period of time, or an obvious erratic movement pattern, can initiate emergency escalations to a medical call center (rather than a security call center) or trusted individuals.

Embodiments can also provide protection for residents or occupants with dementia, developmental or mental disabilities, or similar conditions. People suffering with such afflictions have been known to wander away from the residences, potentially with inadequate clothing, and often become lost without knowing their identity or address. Embodiments of the invention can identify when a particular occupant is passing through an exit by raising an audible alert or alarm, and sending notifications to appropriate personnel. Likewise, embodiments can also provide protection for young residents or occupants, e.g., babies, toddlers, young children. Young people could walk away from the residences, or walk through a door or gate to an area where there may be adverse conditions (e.g., exiting a house without proper clothing on a very hot or very cold day), or hazards, such as a pool, hot tub, or busy street. Embodiments of the invention can identify when a particular occupant is passing through an exit by raising an audible alert or alarm, and sending notifications to appropriate personnel, whether the person him or herself, or to others on or off the premises.

Embodiments of the invention equipped with a sensor network which detects body position can determine if an occupant has fallen, and if the occupant has difficulty getting back up. If so, emergency alerts can be generated and transmitted. Embodiments equipped with a sensor network which detects vital signs (e.g., respiration, blood pressure, heart rate), the system can determine when an occupant may be in distress such as when the vital signs change quickly, and/or appreciably, from a baseline, and generate and transmit appropriate emergency alerts. In addition, embodiments can compare vital signs measured before or when an occupant left a designated area with vital signs measured after or when the occupant returned to the designated area and generate an alert that indicates a change in health of the occupant while the occupant was out of the designated area.

Embodiments of the invention further provide for health and wellness monitoring. Goal tracking activity reminders and calculators can interact with an occupant as the occupant enters or exits a designated area. The system can connect, via wireless or wired means, to smart pill holders, which can detect whether an occupant has taken medication at the normal or prescribed time or not. The system can remind the occupant that he or she needs to take medication, especially as the occupant is exiting the premises without his or her medication.

As mentioned above, embodiments of the invention may be linked to outside service providers. As the system learns and recognizes the likely schedules of occupants, the system can autonomously schedule repair or service visits with a service provider who is part of a trusted network as the system knows when a homeowner is likely to be home. In addition, for systems which monitor movement in a building, the system can track a repair technician to monitor his or her movements within the building and can generate and transmit a message to an owner or generate an audible alarm when the technician ventures into areas of the building in which they have no need or authorization to go. Many home owners, due to scheduling constraints, leave service providers alone in a home or business. According to embodiments of the invention, however, a service provider such as a plumber working in a kitchen maybe virtually fenced by an owner to the kitchen, foyer and a connected bathroom only. If the plumber wanders off, for example, toward the bedrooms, an alarm can be sounded or a message sent to the owner regarding the change in status. For large renovations, often when owners temporarily move out of a building as it is being renovated, insurance may require logging of the ingress and egress of service personnel working on site. Embodiments of the invention can automatically log all ingress and egress times which conforms to the requirements. Also, city and utility services can send out alerts that service personnel for example, a meter reader, will be at a residence at a certain time, to give notice to the building owner. A photo of the service personnel may even be shared for greater authentication.

In addition, embodiments of the invention provide for a messaging and watch system for an entire designated area. If, for example, an unknown person is tracked by the system knocking on more than one door in an apartment complex, the system can alert all tenants of the activity, and alert a particular unit's occupant before he or she answers the knock at his or her door.

FIG. 4 illustrates a computing environment in which an embodiment of the invention may operate. The monitoring and control system software application 420 is a central component of the monitoring and control system. It runs in a continual processing cycle on local controller 405 in or proximate to the designated area, receiving and using a variety of inputs as described herein with regard to FIGS. 1A-1F and 2. The application's main loop receives input from the set of sensors 410 coupled in communication with the controller 405. This may be accomplished either through a notification push from a sensor or hardware interface, or via a polling mechanism. The application receives non-sensor inputs from components within or cooperating with the monitoring and control system, such as from user interface 430, clients 470 (e.g., laptop or desktop computers, and software applications executing thereon, that may perform some or all of the same or similar functions as user interface 430, mobile communication devices, geofencing application 435, etc.), and mobile communication devices 465, and from non-monitoring and control system inputs, which may include: geo location data of mobile communication devices 465; geo fencing data provided by application 435; historical schedule information for known users stored in database 450 that is retrieved and stored in a local data store of memory 425; facial identification or gesture recognition of individuals by cameras either embedded in a console, display panel, monitor, or other display device or user interface 430, or a stand-alone camera; explicitly provided user or occupant schedules; time of day; day of week; time of year; current calendar information for known system users; sun rise and sunset times; weather; etc.

It is appreciated that the monitoring and control system software application 420, while described above as a software application wholly executing on local controller 405, could, in other embodiments, reside on and be executed by one or more application servers 460 in a cloud computing environment. In such an embodiment, functionality of the monitoring and control system software may be distributed across one or more monitoring and control system application server(s) 460 and local monitoring and control system software application 420. For example, monitoring and control system software application 420 may be little more than a web browser-based software application that gathers information and input from one or more of sensor software applications 415, user interface 430, geofencing software application 435, and mobile communication devices 465, and then accesses the monitoring and control system application server 460 via network interface and protocols 445. The monitoring and control system software application 420 may interact with a corresponding monitoring and control system software application executing on system application server 460 via, for example, a web portal. In such an embodiment, the software 420 forwards such information and input to application server 460, where the monitoring and control system software application executing on application server 460, operating in conjunction with information stored in an associated database 455, performs such steps as selecting a confidence level at 110, or selecting an action to be taken 120. Monitoring and control system software executing on application server software 460 communicates any output to monitoring and control system software 420 in response thereto, and the monitoring and control system software 420, in turn, communicates with (e.g., provides output to be delivered to) one or more of the sensor software applications 415, local datastore in memory 425, user interface 430, geofencing software application 435, and mobile communication devices 465. Alternatively, some devices or applications, such as geofencing software application 435, or mobile communication devices 465, may communicate directly with monitoring and control system software executing on application server 460. In another example, functionality of the monitoring and control system software may be distributed across one or more monitoring and control system application server(s) 460 and local monitoring and control system software application 420 in such manner that the monitoring and control system software application executing on application server 460 performs some of the steps while the local monitoring and control system software application 420 performs other of the steps. The distribution of tasks may be configured, or context sensitive, for example, based on processing needs and/or resources. For example, in the event of a time out in communications between monitoring and control system application servers 460 and monitoring and control system software application 420, monitoring and control system software application can perform tasks that software executing on the application server 460 otherwise performs.

Application 420 further pushes the received data to a main event store database 450, and, optionally, to the local history, massage data to ensure a consistent format, eliminate superfluous events, de-duplicate polled sensor data and extend an existing entry's trigger time, time stamp normalization, etc.

Application 420 further maintains a list of occupancy state objects, event objects for both current sensed events as well as potential sensed events that are under being evaluated. The objects encapsulate and track the criteria for each object type, including the starting/triggering input, all subsequent sensors that contribute to the potential sensed event and any potential confidence weighting of the potential sensed event.

Application 420 manages the occupancy state and sensed event objects—triggered on a timed-basis, or upon receipt of new data to: evaluate the under-consideration transitions of confidence levels of occupancy state and sensed event objects based on the triggers, conditions and rules described herein, specifically the enumerated confidence levels of occupancy states and enumerated potential alarm events.

Application 420 also manages the action to be taken objects—triggered on a timed-basis or upon creation of new sensed event objects, including creating a new sensed event object as a result of the intersection of newly transitioned confidence level of occupancy state, sensed event, and monitoring and control system sensitivity objects, processing the on-going action to be taken object based on the rules outlined in the enumerated actions to be taken discussion, including actions such as transmitting mobile communication device push notifications to appropriate users, initiating various alarm conditions as appropriate, transmitting notifications to social media as appropriate, and challenging an unknown user via a user interface console.

In this description, numerous specific details are set forth such as examples of specific systems, languages, protocols, components, etc., in order to provide a thorough understanding of the various embodiments. It should be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations as described above. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description above. In addition, embodiments are not described with reference to any particular programming language. It is appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Although the invention has been described and illustrated in the illustrative embodiments, it is understood that this disclosure has been made only by way of example, and that numerous changes in the details of implementation of embodiments of the invention can be made without departing from the spirit and scope of the invention, which is only limited by the claims that follow. Features of the disclosed embodiments can be combined and rearranged in various ways.

What is claimed is:

1. A non-transitory computer readable storage media having instructions stored thereon that, when executed by a processor of a monitoring and control system, cause the monitoring and control system to perform operations comprising:

receiving input indicating occupancy state of a user with regard to a designated area, or a plurality of areas therein or portions thereof;

receiving, from one or more of a plurality of sensing capable devices of, or in communication with, the monitoring and control system, input indicating a respective event involving the user entering or exiting the designated area, or an area therein or portion thereof, the sensing capable devices situated on or near the user, within the designated area, or in one or more of the plurality of areas therein, or portions thereof;

selecting one of a plurality of confidence levels regarding the occupancy state of the user with regard to the designated area, or one or more of the plurality of areas therein or portions thereof, responsive to the received input indicating occupancy state of the user with regard to the designated area; and transmitting a message to the user responsive to the respective event involving the user entering or exiting the designated area, the occupancy state of the user with regard to the designated area, and the selected confidence level.

2. The non-transitory computer readable storage media of claim 1, wherein receiving input indicating occupancy state of the user with regard to the designated area comprises receiving input from a user interface, and/or a plurality of sensors, and/or one or more mobile communication devices, of, or in communication with, the user or the monitoring and control system, the input indicating occupancy state of the user with regard to the designated area.

3. The non-transitory computer readable storage media of claim 2, wherein receiving input from the plurality of sensors indicating occupancy state of the user with regard to the designated area comprises receiving input from one or more sensors selected from a group consisting of: an occupancy sensor, an alert sensor, an environmental sensor, a temperature-sensing capable device, and combinations thereof.

4. The non-transitory computer readable storage media of claim 2, wherein receiving input from the user interface indicating occupancy state of the user with regard to the designated area comprises receiving input from the user via one or more user interfaces of the monitoring and control system or one or more mobile communication devices.

5. The non-transitory computer readable storage media of claim 1, further comprising receiving additional input from one or more mobile communication devices associated with or around the user or the designated area, and wherein selecting one of the plurality of confidence levels regarding occupancy state of the user with regard to the designated area further comprises selecting one of the plurality of confidence levels regarding occupancy state of the user with regard to the designated area responsive to the received additional input.

6. The non-transitory computer readable storage media of claim 1, further comprising receiving additional input relevant to or about the user with respect to the designated area, or one or more rooms therein or portions thereof, wherein the additional input is selected from a group consisting of: input from the user to select a particular one or more rooms in or portions of the designated area, input from the user to select a sensor therein, learned occupancy schedule of the user, pattern of where and/or when mobile communication devices associated with the user are present in, or absent from, the designated area, time of day, day of week, seasonal-, holiday-, or personal observances of the user, current weather conditions, and adverse and/or extreme weather conditions; and wherein selecting one of a plurality of confidence levels regarding occupancy state of the user with regard to the designated area further comprises selecting one of the plurality of confidence levels regarding occupancy state of the user with regard to the designated area responsive to the received additional input.

7. The non-transitory computer readable storage media of claim 1, further comprising receiving input regarding a sensitivity level for the monitoring and control system, and wherein transmitting the message to the user responsive to the respective event involving the user entering or exiting the designated area, the occupancy state of the user with regard to the designated area, and the selected confidence level, comprises transmitting the message to the user further responsive to the sensitivity level for the monitoring and control system.

8. The non-transitory computer readable storage media of claim 1, further comprising receiving additional input regarding the user with regard to the designated area or thereabouts, selected from a group consisting of: time of day, learned occupancy schedule of the user, pattern of where and/or when mobile communication devices associated with the user are present, in or absent from, the designated area, day of week, seasonal-, holiday-, or personal observances of the user, current weather conditions, adverse and/or extreme weather conditions; and wherein transmitting the message to the user responsive to the respective event involving the user entering or exiting the designated area, the occupancy state of the user with regard to the designated area, and the selected confidence level, comprises transmitting the message to the user further responsive to the received additional input.

9. The non-transitory computer readable storage media of claim 1, further comprising receiving input selecting an occupancy state transition sensitivity level, and wherein selecting one of a plurality of confidence levels regarding occupancy state of the user with regard to the designated area responsive to the received input further comprises selecting one of the plurality of confidence levels regarding occupancy state of the user with regard to the designated area further responsive to the selected occupancy state transition sensitivity level.

10. A method executed by a processor of a monitoring and control system, the method comprising:

receiving input indicating occupancy state of a user with regard to a designated area, or a plurality of areas therein or portions thereof;

receiving, from one or more of a plurality of sensing capable devices of, or in communication with, the monitoring and control system, input indicating a respective event involving the user entering or exiting the designated area, or an area therein or portion thereof, the sensing capable devices situated on or near the user, within the designated area, or in one or more of the plurality of areas therein, or portions thereof;

selecting one of a plurality of confidence levels regarding the occupancy state of the user with regard to the designated area, or one or more of the plurality of areas therein or portions thereof, responsive to the received input indicating occupancy state of the user with regard to the designated area; and transmitting a message to the user responsive to the respective event involving the user entering or exiting the designated area, the occupancy state of the user with regard to the designated area, and the selected confidence level.

11. The method of claim 10, wherein receiving input indicating occupancy state of the user with regard to the designated area comprises receiving input from a user interface, and/or a plurality of sensors, and/or one or more mobile communication devices, of, or in communication with, the user or the monitoring and control system, the input indicating occupancy state of the user with regard to the designated area.

12. The method of claim 2, wherein receiving input from the plurality of sensors indicating occupancy state of the user with regard to the designated area comprises receiving input from one or more sensors selected from a group consisting of: an occupancy sensor, an alert sensor, an environmental sensor, a temperature-sensing capable device, and combinations thereof.

13. The method of claim 2, wherein receiving input from the user interface indicating occupancy state of the user with regard to the designated area comprises receiving input from the user via one or more user interfaces of the monitoring and control system or one or more mobile communication devices.

14. The method of claim 10, further comprising receiving additional input from one or more mobile communication devices associated with or around the user or the designated area, and wherein selecting one of the plurality of confidence levels regarding occupancy state of the user with regard to the designated area further comprises selecting one of the plurality of confidence levels regarding occupancy state of the user with regard to the designated area responsive to the received additional input.

15. The method of claim 10, further comprising receiving additional input relevant to or about the user with respect to the designated area, or one or more rooms therein or portions thereof, wherein the additional input is selected from a group consisting of: input from the user to select a particular one or more rooms in or portions of the designated area, input from the user to select a sensor therein, learned occupancy schedule of the user, pattern of where and/or when mobile communication devices associated with the user are present in, or absent from, the designated area, time of day, day of week, seasonal-, holiday-, or personal observances of the user, current weather conditions, and adverse and/or extreme weather conditions; and wherein selecting one of a plurality of confidence levels regarding occupancy state of the user with regard to the designated area further comprises selecting one of the plurality of confidence levels regarding occupancy state of the user with regard to the designated area responsive to the received additional input.

16. The method of claim 10, further comprising receiving input regarding a sensitivity level for the monitoring and control system, and wherein transmitting the message to the user responsive to the respective event involving the user entering or exiting the designated area, the occupancy state of the user with regard to the designated area, and the selected confidence level, comprises transmitting the message to the user further responsive to the sensitivity level for the monitoring and control system.

17. The method of claim 10, further comprising receiving additional input regarding the user with regard to the designated area or thereabouts, selected from a group consisting of: time of day, learned occupancy schedule of the user, pattern of where and/or when mobile communication devices associated with the user are present, in or absent from, the designated area, day of week, seasonal-, holiday-, or personal observances of the user, current weather conditions, adverse and/or extreme weather conditions; and wherein transmitting the message to the user responsive to the respective event involving the user entering or exiting the designated area, the occupancy state of the user with regard to the designated area, and the selected confidence level, comprises transmitting the message to the user further responsive to the received additional input.

18. The method of claim 10, further comprising receiving input selecting an occupancy state transition sensitivity level, and wherein selecting one of a plurality of confidence levels regarding occupancy state of the user with regard to the designated area responsive to the received input further comprises selecting one of the plurality of confidence levels regarding occupancy state of the user with regard to the designated area further responsive to the selected occupancy state transition sensitivity level.

\* \* \* \* \*